United States Patent
Hervet et al.

(10) Patent No.: US 7,146,615 B1
(45) Date of Patent: Dec. 5, 2006

(54) SYSTEM FOR FAST DEVELOPMENT OF INTERACTIVE APPLICATIONS

(75) Inventors: Yves Hervet, Thorigne Fouillard (FR); Jean-Antoine Carado, Melesse (FR)

(73) Assignees: France Telecom, Paris (FR); Telediffusion de France, Paris (FR)

( * ) Notice: Subject to any disclaimer, the term of this patent is extended or adjusted under 35 U.S.C. 154(b) by 748 days.

(21) Appl. No.: 10/030,651

(22) PCT Filed: Jul. 6, 2000

(86) PCT No.: PCT/FR00/01950

§ 371 (c)(1),
(2), (4) Date: May 10, 2002

(87) PCT Pub. No.: WO01/04747

PCT Pub. Date: Jan. 18, 2001

(30) Foreign Application Priority Data

Jul. 9, 1999 (FR) .................................. 99 08945

(51) Int. Cl.
G06F 9/46 (2006.01)
G06F 15/16 (2006.01)

(52) U.S. Cl. .................. 719/318; 717/110; 717/113; 725/37; 715/762; 715/763

(58) Field of Classification Search ............ 719/318; 717/113, 110; 715/762, 763; 725/37
See application file for complete search history.

(56) References Cited

U.S. PATENT DOCUMENTS

| | | | | |
|---|---|---|---|---|
| 5,524,193 A * | 6/1996 | Covington et al. | ......... | 715/512 |
| 5,680,639 A * | 10/1997 | Milne et al. | ............ | 715/500.1 |
| 5,826,085 A * | 10/1998 | Bennett et al. | ............ | 719/316 |
| 5,956,479 A * | 9/1999 | McInerney et al. | ........... | 714/38 |
| 6,009,256 A * | 12/1999 | Tseng et al. | .................. | 703/13 |
| 6,360,195 B1 * | 3/2002 | Liao et al. | ..................... | 703/28 |
| 6,453,459 B1 * | 9/2002 | Brodersen et al. | ......... | 717/100 |
| 2003/0193520 A1 * | 10/2003 | Oetzel | ........................ | 345/723 |

FOREIGN PATENT DOCUMENTS

WO    WO 96 31829    * 10/1996

(Continued)

OTHER PUBLICATIONS

OpenTV Inc, "OpenAuthor Overview Technical White Paper", Jul. 1998.*

(Continued)

Primary Examiner—William Thomson
Assistant Examiner—Li Zhen
(74) Attorney, Agent, or Firm—Marshall, Gerstein & Borun LLP

(57) ABSTRACT

The invention concerns a system for developing interactive applications transmitted through a network. The system comprises, activated by the operation of a computer, an electronic editor (E) for simulating a display screen of a display monitor, and an interface controlling (MCS) a control module associated with said display monitor. A module generating virtual objects (GOV) specific to the application to be developed is provided, the virtual objects being selected at least among images in point mode, video files, textual files, capable of being edited, displayed, represented by the editor (E) for forming a scene of the pplication. A control module (COR) for correlating event/action pairs is provided, an event corresponding to the imbalance of the state of an operation system and an action corresponding to an initialization or a modification of the display or the representation of one or several scenes constituting the applications. The invention is useful for developing interactive applications, in particular on TV channel, Internet network or the like.

18 Claims, 16 Drawing Sheets

FOREIGN PATENT DOCUMENTS

WO         WO 99 04349     *    1/1999

OTHER PUBLICATIONS

M. Vazirgiannis, et al, "i-Mu.S.E.—Interactive Scenario Editor", IEEE, 1998, pp. 145-152.*

J. Agnew, et al, "The Right Tool for the Job: A Quest for the Perfect Authoring Package", ACM, 1992, pp. 253-258.*

B. Krushnamurthy et al, "Yeast: A General Purpose Event-Action System", IEEE, 1995, pp. 845-857.*

* cited by examiner

1.) OPentv
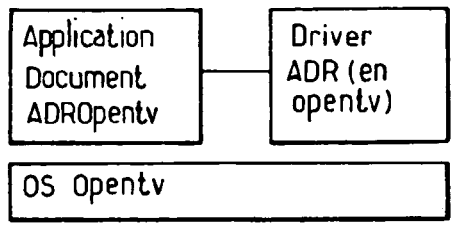
2.) Mheg
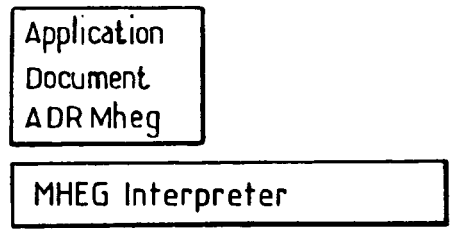
*FIG. 1a*
3.) Java Tv
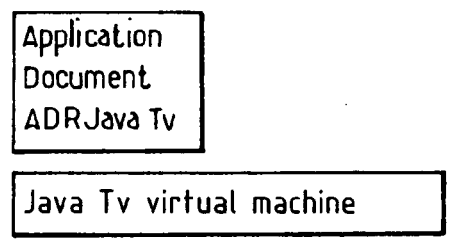
4.) HTML application
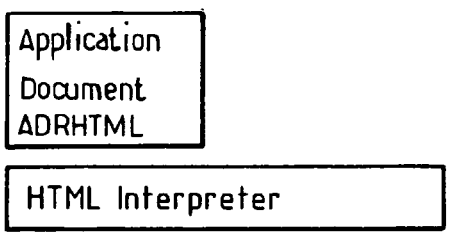
5.) Document application for specific software for WWW (example roaster, neuron) Internet platform
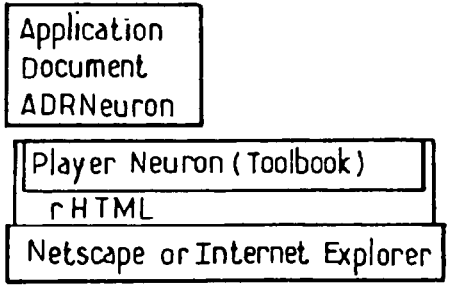

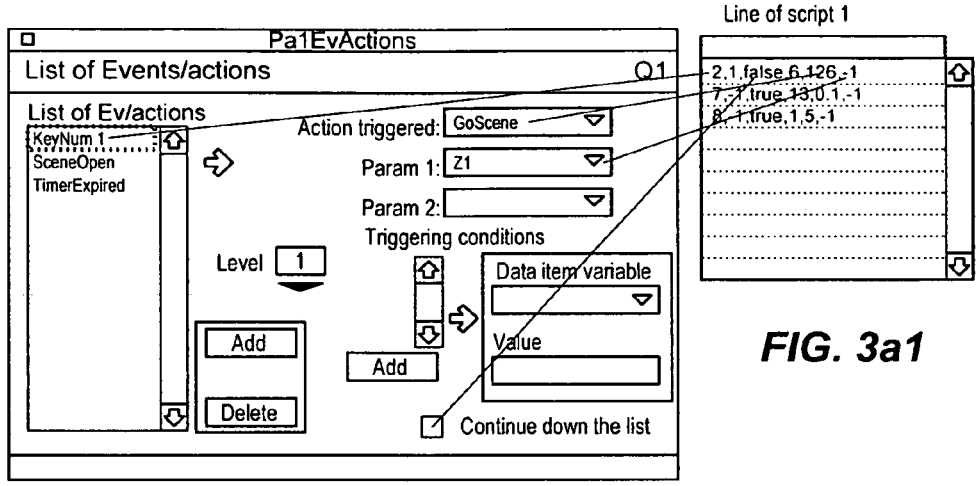
FIG. 3a1
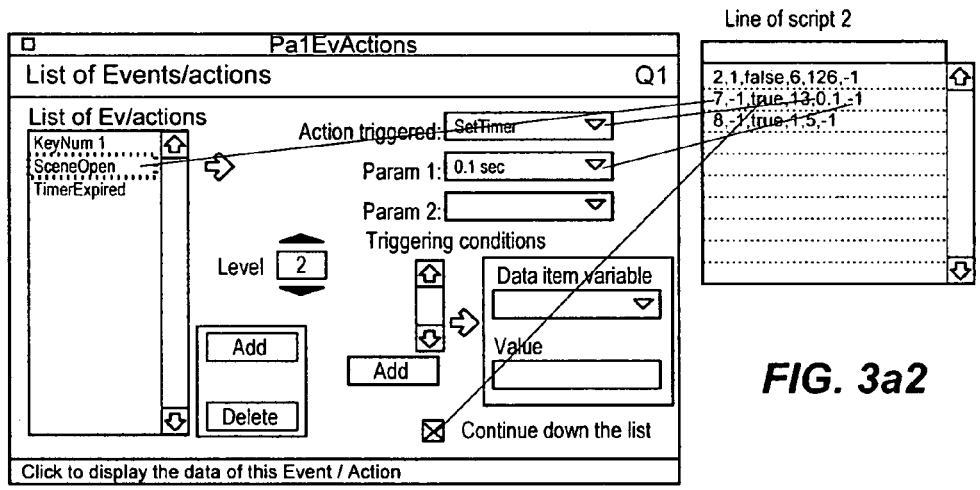
FIG. 3a2
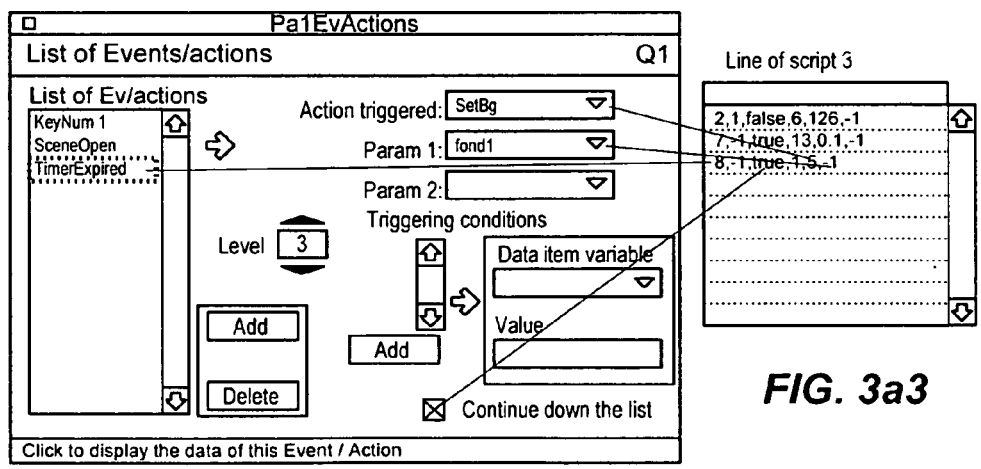
FIG. 3a3

Definition of object 1
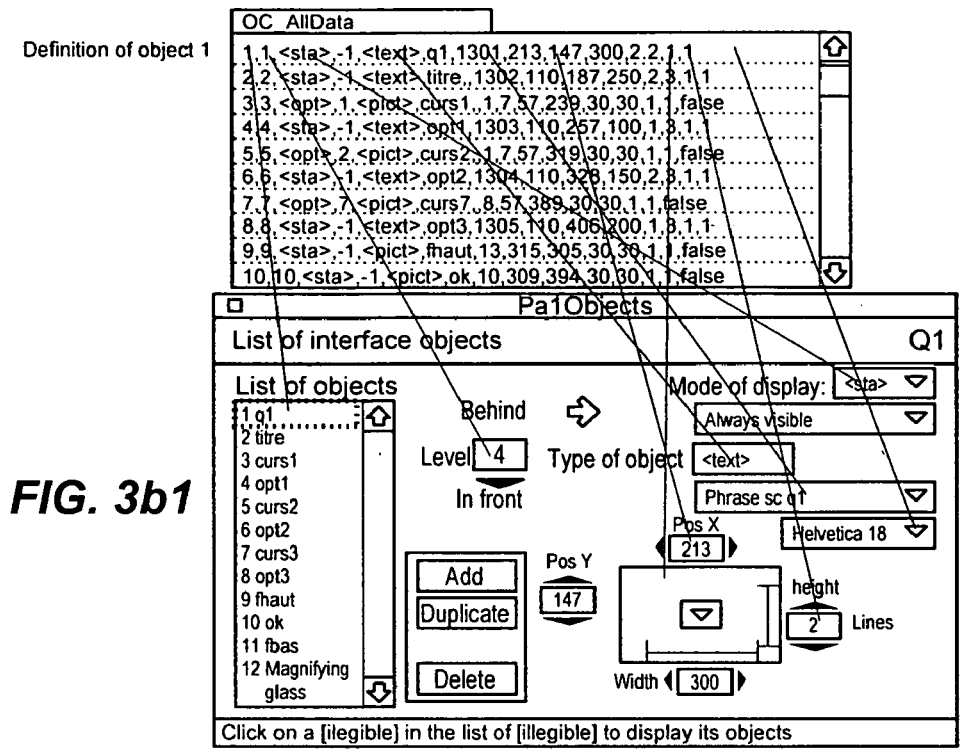
FIG. 3b1
Definition of object 2
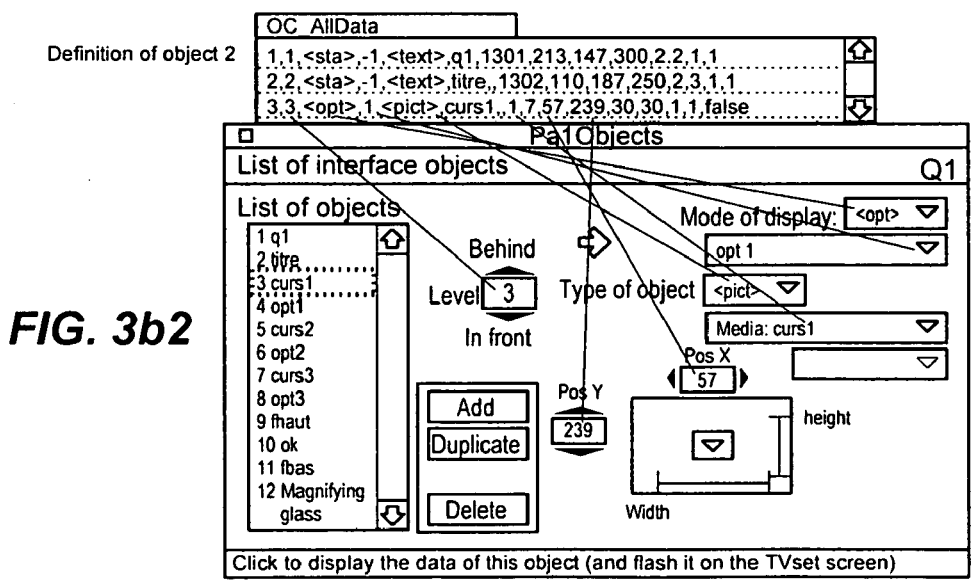
FIG. 3b2

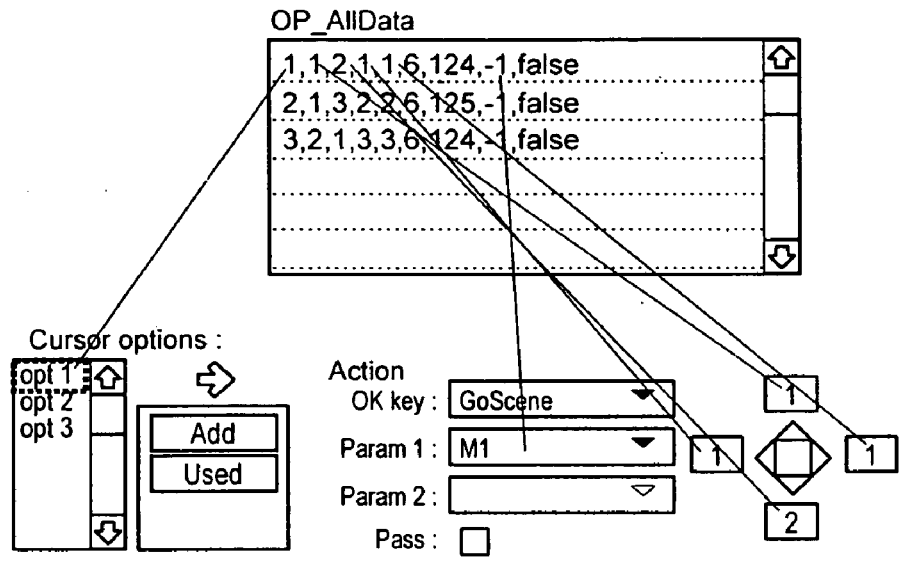
FIG. 3h1
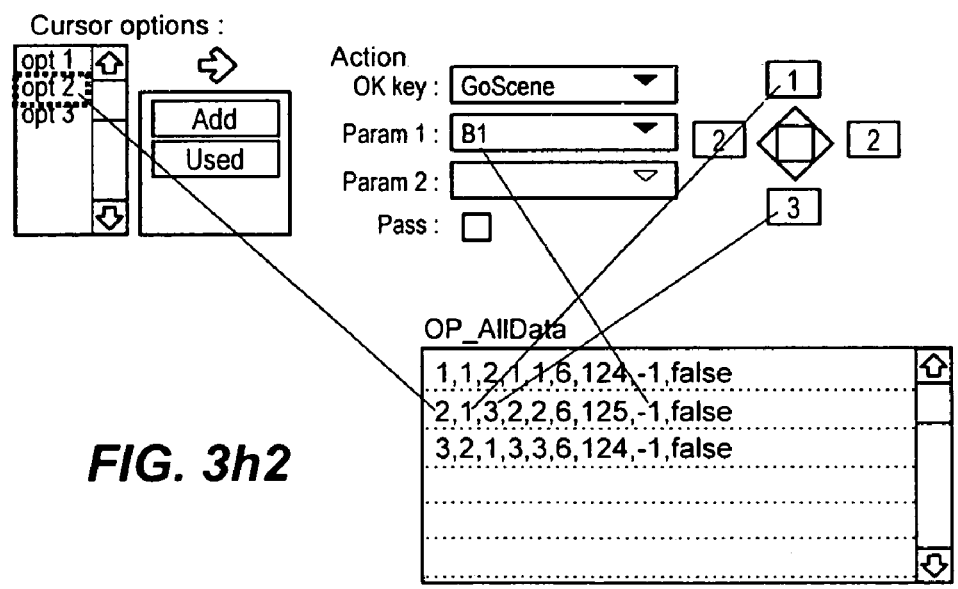
FIG. 3h2

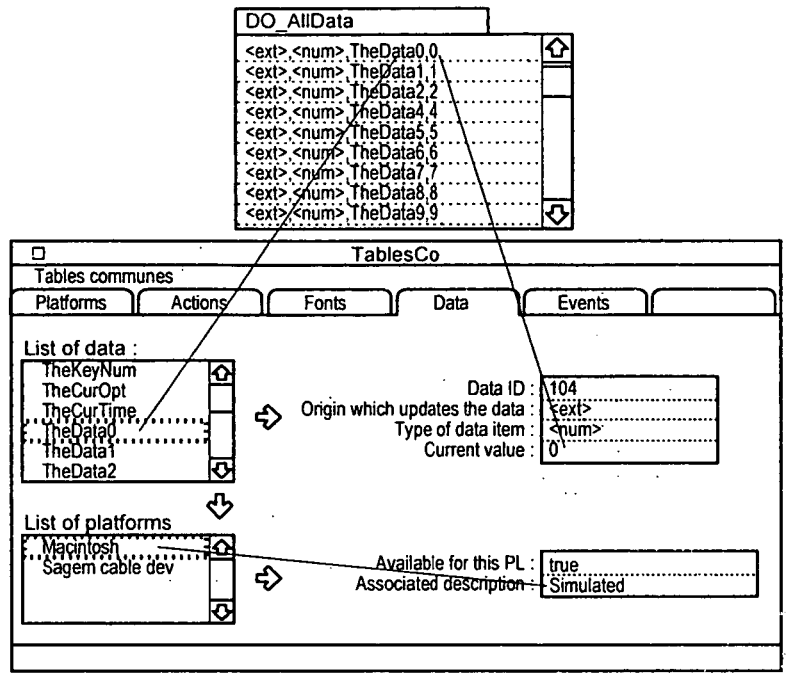
FIG. 3j1
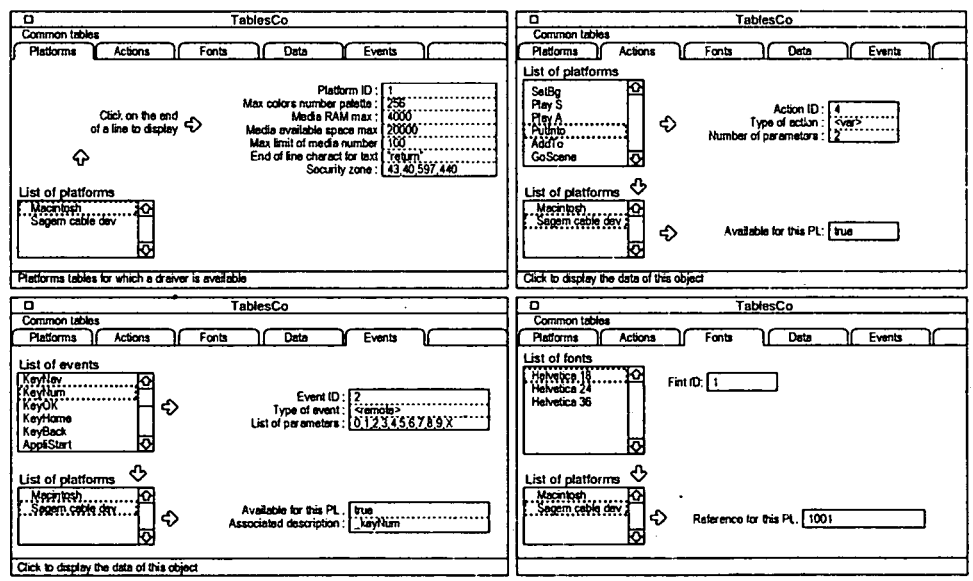
FIG. 3j2

SYSTEM FOR FAST DEVELOPMENT OF INTERACTIVE APPLICATIONS

FIELD OF INVENTION

The present invention relates to a system for the fast development of interactive applications.

BACKGROUND OF THE INVENTION

The very considerable development of digital telecommunication systems, using cable, satellite or the airwaves, is causing a constant and sustained rise in the demand for interactive applications broadcast by these digital telecommunication systems, interactive applications which are or are not associated with television programs.

These applications may involve services as diverse as weather forecasts, management of stock market portfolios, TV, radio or similar magazine-type applications.

In general, and in order to allow lasting growth of the development of these applications, on account of the increasing complexity of these applications and of the services provided by them, the terminals for accessing these applications, which initially consisted primarily of TV receivers furnished with a remote control module, have evolved toward computer terminals furnished with capabilities for processing video images and for sound restoration, which apparatuses are more prosaically referred to as "lounge computers" within the mass-market arena.

On account of this evolution, the terminals for accessing these applications being thus endowed with evermore powerful operating systems, there is a great demand for access to evermore sophisticated applications.

On account of the very diverse, even disparate nature of the terminals for accessing these interactive applications, it being possible for applications of this type to be accessible by way of very different systems such as OPEN TV marketed by the OPEN TV Incorporated company in the United States, Media Highway, distributed in France by the company CANAL+, Mheg open system complying with the ISO standardization system, and JAVA system dedicated to television, currently being set up, the development of interactive applications is very complex, insofar as such development can be envisaged only as a function of the access system implemented.

Stated otherwise, with a view to such development, the latter can be undertaken only in respect of a given operating system corresponding to that of the final access system used.

Under such conditions, the aforesaid interactive applications are confronted, for each operating system considered, with the following constraints:
  definition of the structure of the interactive application considered and of its logic model, an interactive application being composed of scenes, each scene being itself composed of virtual objects formed by diverse objects or components while allowing representation;
  definition of the characteristics of the access terminal, or target platform allowing access to or the execution of this interactive application, these characteristics possibly comprising, in particular, the RAM random access memory size available, the accessible fonts and the available color palettes;
  discrimination between permanent elements or objects, downloaded with the application, and necessary for the minimum functioning of the application, temporal elements, required at a given instant, broadcast cyclically;
  updating of an interactive application or of one or more scenes on the basis of data internal or external to the access system;
  reuse of objects, virtual objects of a scene or of one or more scenes themselves;
  association with the events external to the access system, which are entered via a keyboard, a numerical pad or a television remote control package, a modem or a microprocessor card, and with the events internal to the access system, such as timeouts, a control language sufficient to endow the application with its interactive nature;
  monitoring of the construction of a scene, of its representation and of the stringing together of successive scenes.

Whereas the aforesaid interactive applications are currently constructed for the and dedicated to the operating system of the platform or of the access system, these applications must, at present, be constructed within the corresponding strict framework.

SUMMARY OF THE INVENTION

The aim of the present invention is to remedy the aforesaid drawbacks by implementing a system for developing interactive applications which are not dedicated to the system for accessing these applications.

In particular, with this aim, an object of the present invention is the implementation of a system for developing interactive applications making it possible to open up the TV medium, that is to say the system for telecommunication by television, to any type of interactive application tied or otherwise to the TV programs telebroadcast.

In particular, and on account of the absence of any tie between the interactive applications, developed by virtue of the development system which is the subject of the present invention, and the system or systems for accessing these applications, another object thereof is the implementation of a system for developing interactive applications allowing the development of native interactive applications and the translation of these native interactive applications into interactive applications dedicated to one or other of the operating systems used by the system or platform for accessing these dedicated interactive applications.

With reference to the abovementioned object, another object of the present invention is finally, by virtue of the process for translating native interactive applications developed by virtue of the development system which is the subject of the present invention, the implementation of a process for translating these native interactive applications into interactive applications dedicated to media other than the TV media, in particular the media for transmitting messages or documents in a network, such as HTML documents.

The system for developing interactive applications distributed on a digital transmission channel, which is the subject of the present invention, these interactive applications being installed at a point of the transmission network and consisting of a succession of thematic scenes incorporating images in point mode, video images, sound sequences and information in text file form represented at the level of at least one display monitor, the interactive nature of these applications being produced by way of a specific functionalization of the control interface for a control module of the display monitor furnished with an operating system, the assembly consisting of the display monitor, control module and operating system constituting an execution platform, comprises at least one electronic editor allowing the simulation, on the one hand, of the display screen of this display monitor, and, on the other hand, of the control interface for a control module associated with this display monitor. It also comprises a module generating virtual objects, specific to the application considered, each virtual object consisting of objects or components chosen from among at least images in point mode, video images, sound sequences and information in the form of text files and being capable of being edited, displayed and represented by the electronic editor so as to form at least one constituent scene of an interactive application considered.

A control module for correlating a plurality of event/action pairs is provided, an event being defined as the breakage of state equilibrium of the operating system and an action being defined as an initialization respectively a modification of at least one of the display and representation parameters for one or more constituent scenes of this application. A module for storing the set of these event/action pairs, correlated and constituting the interactive application, at least in native form, is provided.

The system for developing interactive applications, which is the subject of the present invention, finds application to the production of interactive applications distributed on transmission channels such as the television channels and the multimedia systems such as WWW, the interactive applications being, in this case, produced in the form of HTML documents, of JAVA interpreted language and known by the name "JAVA script" of JAVA applications or "JAVA Applet" or of a document in the format executable by audio or video representation software, termed a specific "pluggin".

BRIEF DESCRIPTION OF THE DRAWINGS

It will be better understood on reading the description and looking at the drawings in which:

FIG. 1$b$ represents, by way of illustration, a schematic diagram of the system for developing interactive applications, which is the subject of the present invention;

FIG. 1$c$ represents, in the form of a tree structure, the constituent elements of an interactive application allowing the construction of any type of interactive application by virtue of the development system which is the subject of the present invention as represented in FIG. 1$b$;

FIG. 1$d$ represents, in the form of a flowchart, the logic format of an interactive application developed by virtue of the development system which is the subject of the present invention, this logic format producing the functional relations between the various data structures allowing the development of this interactive application;

FIGS. 3$b_1$ and 3$b_2$ represent, by way of nonlimiting example, a software tool for creating virtual objects;

FIG. 3$c$ represents, by way of nonlimiting example, a software tool for editing media, a medium being defined within the context of developing an interactive application by virtue of the development system which is the subject of the present invention, by a determined means of representing an object or component which is a constituent of at least one scene of this interactive application;

FIG. 3$d$ represents, by way of nonlimiting example, a software tool for editing scene backgrounds;

FIG. 3$e$ represents, by way of nonlimiting example, a software tool for editing phrases, in the form of text files assigned either to a scene, or to the interactive application containing this scene;

FIG. 3$f$ represents, by way of illustrative example, a software tool for editing variables, these variables corresponding to a text content or numerical content;

FIG. 3$g$ represents, by way of illustrative example, a software tool for creating scenes;

FIGS. 3$h_1$ and 3$h_2$ represent, by way of nonlimiting example, a software tool for creating options;

FIG. 3$i$ represents, by way of illustrative example, a software tool for editing the attributes of an application;

FIGS. 3$j_1$ and 3$j_2$ represent, by way of nonlimiting example, a software tool for consulting common tables of data specific to the target platform system for accessing the interactive application developed;

FIG. 4$b$ represents, purely by way of illustration, a screen page for management of the creation process represented in FIG. 4$a$;

FIG. 5$b$ represents, by way of illustration, a functional flowchart representative of the set of constituent sequences of an arbitrary interactive application;

MORE DETAILED DESCRIPTION

Figure 1B:
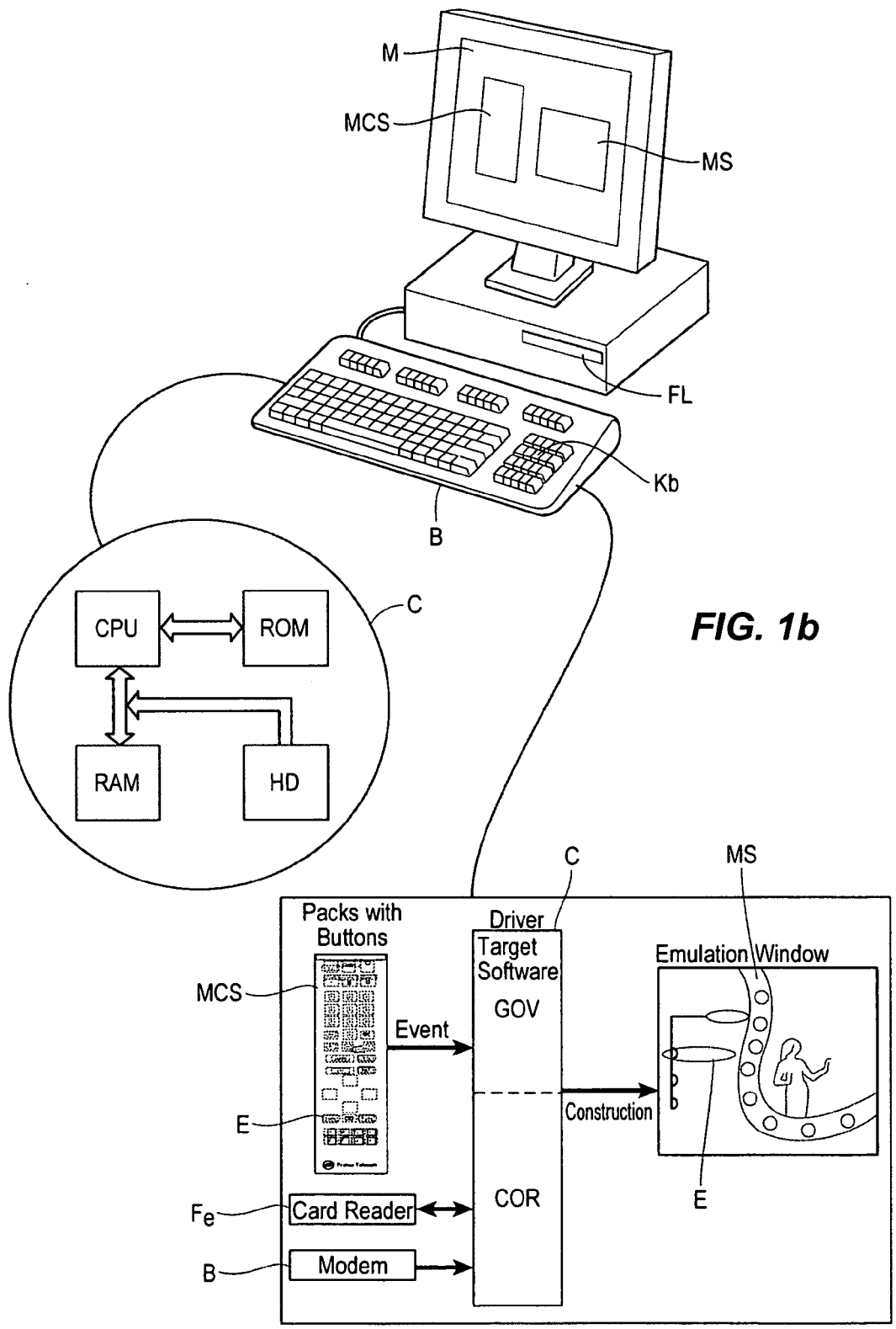
FIG. 1$a$ represents at points 1) to 5) a schematic diagram illustrating the management of documents in the case of access platforms such as OpenTV, Mheg, JavaTV, HTML applications, specific application for WWW by way of audio or video representation software termed "pluggin" respectively.

A more detailed description of the system for developing interactive applications, which is the subject of the present invention, will now be given in conjunction with FIGS. 1$a$ to 1$c$ and the subsequent figures.

In general, it is recalled, on the one hand, that the interactive applications are installed at a point of the digital transmission network so as to allow transmission of these interactive applications, either when called by the user in the case where these interactive applications are transmitted by way of the WWW, standing for World Wide Web, in the form of HTML documents, or telebroadcast cyclically when the digital transmission channel is a television channel for example. It is indicated, more specifically, that these cyclic data may also contain HTML documents and JAVA interpreted applications or languages, such as defined earlier. In this case, the aforesaid interactive applications are installed at the head of the telebroadcasting network, whereas in the case of the transmission of HTML documents, these applications are for example instigated at the level of a WWW site and of a server for example.

The concept of document is, in general, made explicit as a function of the various access platforms which may be used with reference to FIG. 1a, at points 1) to 5) for the OpenTV, Mheg and JavaTV type platforms, HTML applications proper and applications for audio or video representation software termed "pluggin" specific for the WWW such as "Roadster", "Neuron" for INTERNET access platform. The document is managed by the OS OpenTV operating system by way of an ADR driver, by an Mheg interpreter, by a JavaTV virtual machine, by an HTML interpreter and by software of the client/server type, also referred to as a "player", and a NETSCAPE or INTERNET EXPLORER navigator respectively.

Moreover, it is also recalled that each interactive application consists of a succession of thematic scenes which can incorporate images in point mode, video images, sound sequences and information in the form of text files for example. During access from a system or a platform for accessing these interactive applications, these scenes are represented at the level of at least one display monitor incorporated into the aforesaid access system or platform. By representation of one or more scenes and, eventually, of the interactive application considered, is to be understood the restoring to the user, not only of the set of video information or images by display at the level of this monitor, but also the sound restoration of any corresponding file by way of audio circuits with which the access system or platform is equipped.

The interactive nature of the aforesaid applications is produced by way of a specific functionalization of the control interface for a control module of the display monitor furnished, of course, with an operating system. Thus, the assembly consisting of display monitor, control module and operating system constitutes a system or platform for executing or accessing the interactive application considered.

It is recalled in particular that the operating system considered may be very diverse depending on the access platform used. These operating systems may in particular consist of the following systems: MacOS, PC standing for Personal Computer, UNIX, LINUX or others. In particular, when the access platform used corresponds to the OPEN TV system mentioned previously in the description, it is indicated that the operating system considered is a reduced operating system or one dedicated to the interactive application considered. In such a case, the control module usually consists of a universal control or remote control module with buttons, making it possible to control the television set furnished with the television-type display monitor. It is understood in particular that the dedicated operating system, in this case, can correspond to the assigning of certain functions to the buttons of the remote control package as a function of the requirements of the application.

In the case where the interactive application relates to HTML documents transmitted on the WWW and when the access platform consists of a microcomputer, the operating system considered is none other than the operating system of this microcomputer of course adapted to the management of HTML documents. In the latter case, the global operating system is much more powerful than in the previous case.

Thus, as represented in FIG. 1b, the system for developing interactive applications, which is the subject of the present invention, is constructed on the basis of a microcomputer or of a workstation comprising all the essential elements of the latter, namely a central computing unit CPU, a display monitor M, a work memory RAM and a read-only memory ROM as well as peripheral input/output facilities such as for example a keyboard Kb, a floppy disk reader F1, a mass memory of hard disk type HD and any means of intercommunication when this microcomputer is connected in a network. These elements will not be described in detail since they correspond to conventional elements with which any system of microcomputers or workstation system is equipped.

With reference to FIG. 1b, it is indicated that the system for developing interactive applications, which is the subject of the present invention, is noteworthy in that it comprises an electronic editor, denoted E, allowing the simulation of the display screen of the display monitor as well as of the control interface for a control module associated with this display monitor. Represented in FIG. 1b, by way of non-limiting example, is the simulation of a television control package by way of the monitor M and of course of the editor E. Likewise, represented in FIG. 1b is the simulation of the display screen of the display monitor as a simulated display monitor MS by way of the editor E, this simulated display monitor MS being deemed to represent a scene of a given interactive application. Thus, the simulated control module, denoted MCS, and the simulated display screen of the simulated display monitor MS are represented on the monitor M of the microcomputer housing the system for developing interactive applications, which is the subject of the invention.

Furthermore, as represented in the same FIG. 1b, the aforesaid system comprises a virtual objects generating module, denoted GOV, specific to the application considered. Each virtual object consists of components chosen from among at least images in point mode, video images, 3D images, sound sequences and information in the form of text files which may be edited, displayed and represented by the electronic editor E so as to form at least one constituent scene of the application.

The expression virtual object is understood to mean collections of objects or components consisting of media according to the definition given previously in the description. Thus, when the object or component consists of a sound sequence, that is to say of a digital file allowing the reproduction of a sound sequence, it can be represented by the audio circuits of the platform or system for accessing the interactive application considered. When the object or the component consists of an image in point mode or a video image, this object can also be represented by display, by an image in point mode or a video image, that is to say an image furnished with its specific scanning characteristics, at the level of the monitor and of the simulated monitor MS, whereas when the object or component consists of a text file, the latter can be displayed in text mode, for example on the monitor M and of course on the simulated display monitor MS.

Furthermore, as represented in FIG. 1b, the development system, the subject of the invention, comprises a control module, denoted COR, for correlating a plurality of event/action pairs relating to the constituent scenes of the aforesaid interactive application.

More specifically, it is indicated that an event is defined as the breaking of a state equilibrium of the operating system by an external input in the framework of the execution of the interactive application, whereas an action is defined as an initialization or, as the case may be, a modification of at least one of the display and representation parameters for one or more constituent scenes of the interactive application considered. Of course, an action is deemed to be consecutive to an event or vice versa on account of the interactive nature of the application considered.

Finally, a storage module, such as a hard disk HD, for storing the set of event/action pairs correlated is provided, this set in fact constituting the interactive application, at least in native form, as was mentioned previously in the description. The expression native interactive application designates the set of event/action pairs correlated by virtue of the development system, subject of the present invention, this set of event/action pairs being thus achieved by logic one-to-one mapping between event and action independently of the access format imposed by the system or platform for accessing the interactive application considered on account of the physical and formal characteristics of this access system or platform.

Thus, represented in FIG. 1b are, on the one hand, the physical computation and storage components of the microcomputer, such as computation unit CPU, read-only memory ROM, random access work memory RAM and a mass memory HD, the whole being designated by the reference C and integrated into the microcomputer housing the development system, subject of the present invention, as well as the active elements of this system, that is to say electronic editor E allowing the simulation of the display screen of the simulated display monitor MS and of the control interface, or control module, MCS, associated with this display monitor which are accompanied by the virtual objects generating module GOV and the correlating control module COR. In FIG. 1b, the virtual objects generating module GOV and the control module for correlating the event/action pairs COR are deemed to be embodied in the form of driver software loaded into RAM work memory, either from the hard disk HD or, as the case may be, from the read-only memory ROM. The whole is contained in the package B.

Prior to the description of the virtual objects generating module and of the control module for correlating event/action pairs, a description of the data structure allowing the definition of an interactive application by virtue of the development system, subject of the present invention, will be given in conjunction with FIG. 1c.

With reference to the aforesaid figure, it is indicated that an interactive application is defined by a set of computerized lists defining, for this interactive application, the common structural elements.

Figure 1C:
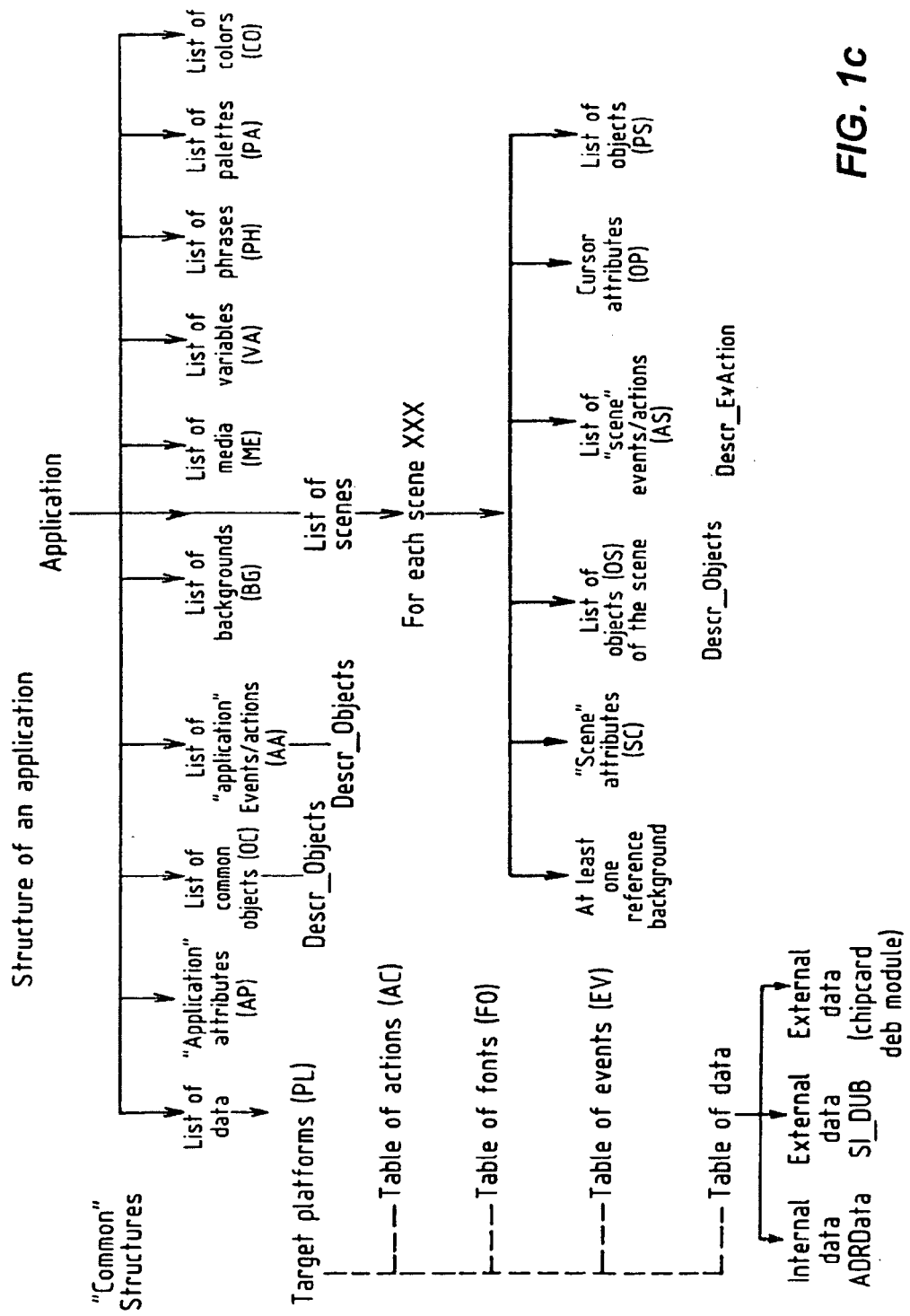

As represented in FIG. 1c, this set of lists can comprise:
 a list of data, this list of data possibly consisting of external digital files or of text files relating to the interactive application considered.
 The list of data makes it possible to define the context of the application or of a group of given applications such as for example an interactive application relating to a weather service, results service for a game such as the lottery, or a horoscope or birth chart consultation. The data are then physical data, such as for example those relating to a region in respect of a weather service or the like;
 a list of attributes of the application, denoted AP;
 a list of the common objects OC which may comprise a description of these objects;
 a list of the events/actions which relate to the application, that is to say of the correlated events/actions, list denoted AA, which may comprise a descriptive list of these events/actions;
 a list of the scene backgrounds, denoted BG;
 a list of scenes, the list of scenes comprising ordered scene references making it possible to represent the sequence of scenes so as to constitute a considered interactive application;
 a list of the media ME used, the concept of media corresponding to that given previously in the description;
 a list of variables VA;
 a list of phrases PH, the phrases being considered to be text files;
 a list of palettes PA of colors for the application considered, and, finally,
 a list of the colors CO actually used.

As far as the list of scenes is concerned, and according to a particularly advantageous nonlimiting embodiment of the development system, subject of the present invention, it is indicated that each scene can be defined by a list of scenes comprising for example:
 at least one element relating to a reference background;
 an element relating to a scene attribute SC;
 a list of constituent objects or components of the scene;
 a list of events/actions of the scene, denoted AS;
 a cursor attribute, denoted OP, this cursor attribute defining in particular the original position of the cursor in the scene so as to allow the interactive use of the scene by the user;
 a list of phrases PS.

A more detailed description of the logic format of a native interactive application developed by virtue of the development system subject of the present invention will now be given in conjunction with FIG. 1d.

In general, it is indicated that this logic format introduces the functional relations between the various data structures allowing the development of a considered interactive application, at least in native form.

Figure 1D:
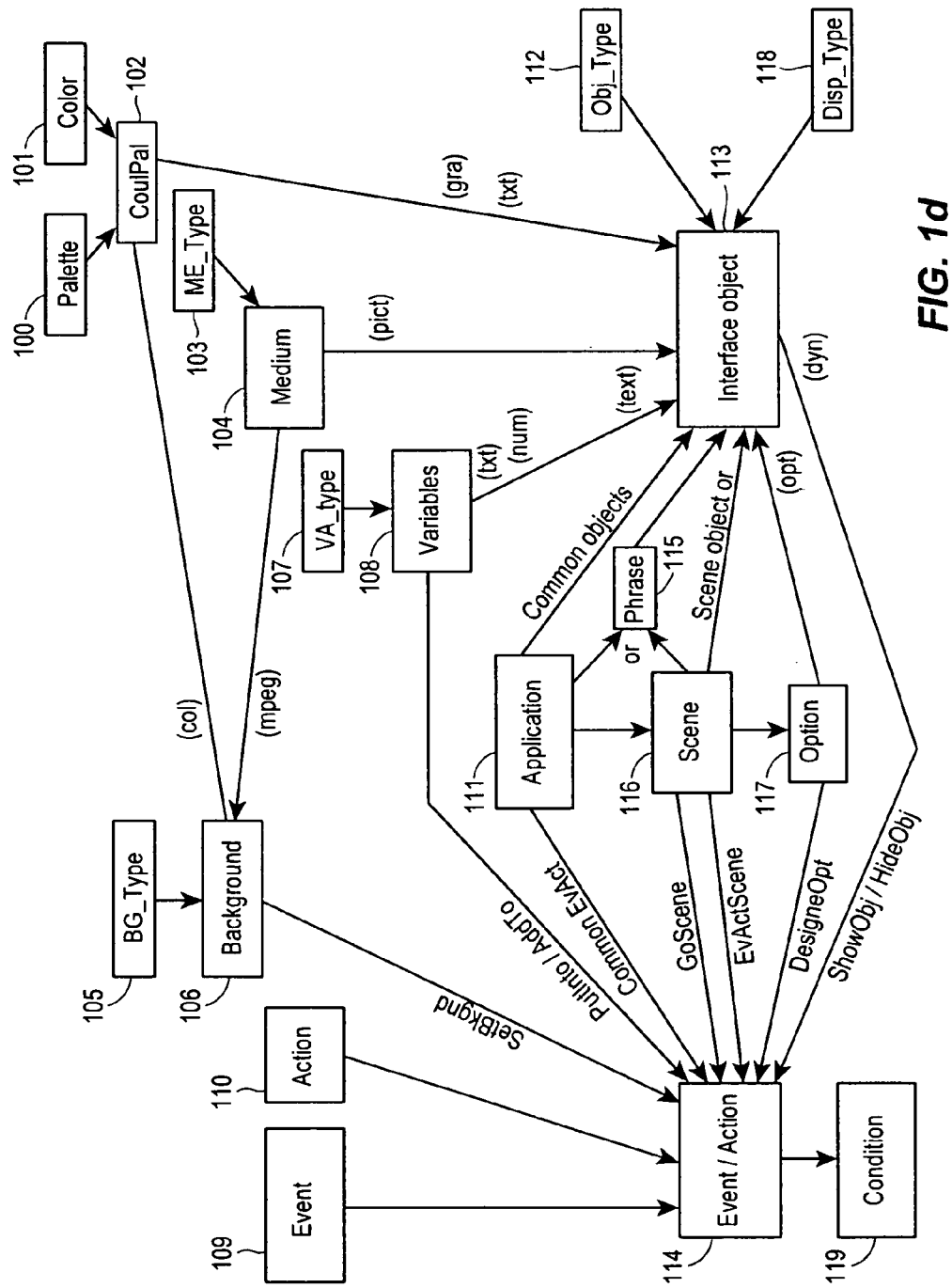

In the aforesaid FIG. 1d, it is indicated that all the rectangular blocks represent in a nonlimiting manner noteworthy data structures implemented by each digital application developed in accordance with the system for the fast development of interactive applications, which is the subject of the present invention, the set of these data structures and the aforesaid functional relations, and in particular the "EVENT"/"ACTION" pairs mentioned previously in the description allowing the definition of the native interactive application considered.

Thus, represented in FIG. 1d are the various data structures represented by rectangles, these rectangles being linked by arrows indicating the logic relation between the corresponding data structures. The data structures may be represented in any form of language, in particular the C++ and JAVA object languages.

The various rectangles bearing the references 100 to 119 designate the following data structures:
 100: color palette
 101: color chosen
 102: color chosen from the palette considered
 103: type of medium used
 104: form of the medium
 105: type of background
 106: background
 107: type of variable VA-type

108: variables, the variables being either of text type, or of numerical type

109: "EVENT"

110: "ACTION"

111: application

112: type of object, designated by OBJ_TYPE

113: interface object

114: "EVENT/ACTION" pair correlated

115: phrases

116: scene

117: options

118: type of display, designated by Disp_Type

119: condition.

The logic relations between aforesaid data structures as represented in FIG. 1*d* are given in chart 1 introduced in the appendices.

In the present description, charts 1 to 28 relating to data structures are introduced as appendices.

In chart 1, the arrows represent the direction of the data streams between data structures.

More general indications, relating to the organization of the aforesaid data structure, will now be introduced below in the description.

In general, for each access platform, a driver for interpreting the data of the application in the language of the interactive engine is provided. The logical data and the data dependent on each platform are structured in a distinct manner.

The data are arranged in the form of structures of common tables relative to the platforms PL, to the fonts FO, to the actions AC, to the events EV, and to the data DO describing and characterizing in an original manner the environment of the platform or of the terminal for accessing the interactive application considered.

Thus, it is within the framework of the aforesaid data structures and of their logical relation, such as represented in FIG. 1*d*, that the set of elements of the system for developing interactive applications, which is the subject of the present invention, makes it possible to perform such development.

By way of nonlimiting example, the data tables relating to the platforms PL may exhibit the structure below as represented in chart 2.

In the aforesaid chart, it is indicated that the data relating to the platform tables PL may advantageously comprise the following variables: maximum number of characters for the texts, which is fixed for example at 255, by way of nonlimiting example, and for each platform PL: platform identifier, platform name, maximum number of colors of the palette, this maximum number, within the framework of the OPEN TV system, being limited to 15, maximum memory in kilobytes for the loading of the media, space available for the medium on the hard disk HD for example, maximum number of media per disk or per storage module, end-of-line character for the texts, mode of safety of the platform and, as the case may be, a parameter from 0 to 255 indicating the effectiveness of the transparency, that is to say the opacity of the transparency color.

As far as the data structure relating to the actions and to the action tables AC is concerned, an action being characterized by several parameters and being triggerable only by an event, the corresponding data structure is given in chart 3.

The aforesaid data structure represented in the abovementioned chart can comprise, for each action, a variable for identifying the action, for the type of the action, that is to say that to which it pertains, for the name of the action, and in respect of each platform PL, at least one Boolean variable whose value is true if this action is available for this platform, a variable for describing the action if the latter is available for the platform PL considered, for example the name of the function or of the procedure to be called.

As far as the character fonts FO available on an access platform or terminal considered are concerned, the data structure is represented in chart 4.

For the available fonts, it is indicated that the data structure FO, for each font, can contain a font identifier, the font name and, for each platform, a font reference for the platform considered, or target platform, such as, depending on the latter's operating system, OPEN TV, Internet: font name+size and of type MAC OS comprising a font identifier as well as the font name+size.

As far as the data structures relating to the events are concerned, for each platform, it is recalled that the events may be internal or external when they are caused by the selecting of a key on a keyboard by a user by the insertion of a memory card or the receiving of a message for example, as mentioned previously in the description.

Under these conditions, the data structure relating to the list of events EV for each platform is given by chart 5.

As regards the events, it is indicated that, for each event, the data structure may be defined by an event identifier, an event type according to what brought about the event, an event name, as well as by parameters relating to the type of event considered.

Furthermore, for each platform PL, may be defined a Boolean variable with the value true if the event is available for this platform and, if this event is available, a variable for describing the event in respect of the platform PL considered.

As far as the data DO describing and characterizing the environment of the terminal platform are concerned, their corresponding data structure can correspond to that given in chart 6.

For each data item, this data structure relating to the data DO can contain a data item identifier, designated by DATA-ID, a data item origin, a data item type and a data item name. Just as in the case of the data structure relating to the events, for each platform PL, may be defined a Boolean variable with the value true if the data item is available for this platform, as well as a description of this data item for the platform considered if this data item is available. This description can consist of the name of the API function, the initials standing for Application Protocol Interface which returns the aforesaid data item.

Chart 6 mentioned previously can contain data linked to various APIs, for example data linked to n signaling systems for a data pathway, data contained in a memory card or else data relating to the television transmission through the information system defined by the DVB standard, the initials standing for Digital Video Broadcasting.

Other additional data structures can be defined for each application or group of applications, in such a way as to allow the updating of the data individual to an application by way of an automaton for example. This additional data structure will not be described in detail.

Generally, and according to a particularly noteworthy aspect of the system for developing interactive applications, which is the subject of the present invention, the set of event/action pairs constitutes the interactive application, at least in native form mentioned previously in the description, insofar as this set defines the suite of chainings required for the representation of this interactive application.

With this aim, the control module COR for correlating a plurality of event/action pairs comprises a module generating a series of instructions exhibiting a checking structure of list of requests type for a given event with regard to which a relation of IF type (condition) on any Boolean variable $B_i$ belonging to a set of Boolean variables $[B_0, B_1, \ldots, B_3, B_n]$ is true THEN the action is then carried out, EVENT designating a variable representative of a given event and ACTION designating a variable representative of an action conditioned on the aforesaid set of Boolean variables.

It is recalled that the variable "EVENT" constitutes for each event/action pair a break of state equilibrium of the operating system, whereas the action constitutes an initialization or a modification of at least one of the display and representation parameters for one or more constituent scenes of the interactive application considered.

Thus, the set of event/action pairs is organized according to a suite of lines of macroinstructions each comprising an execution position field, an event field, an action field, a list of conditions field and a Boolean halt variable field.

The aforesaid macroinstruction set thus constitutes a language of very high design level, adapted for audiovisual, whatever interactive engine is used and allowing particularly original implementation.

In general, the set of events can consist of a table of events. A table of events is given in chart 7.

In the aforesaid chart 7, each event comprises a mnemotechnical designation, an identification number from 1 to 18, the number 18 not of course being limiting, a type reference, a list of parameters and of events comments, in particular the origin of the event considered.

The following events are thus introduced:
- 1: Keynav,
- 2: KeyNum,
- 3: KeyOK,
- 4: KeyHome,
- 5: KeyBack,
- 6: AppliStart,
- 7: SceneOpen,
- 8: TimerExpired,
- 9: SceneClosed,
- 10: event1,
- 11: event2,
- 12: event3,
- 13: event4,
- 14: event5,
- 15: MpegAff,
- 16: InsertCard,
- 17: RemoveCard,
- 18: Receptmodem.

The comments correspond to a comment of the mnemotechnical definition of the event given previously with reference to the aforesaid identification number, as mentioned in the above chart 7.

In the same way, the set of actions can be organized in the form of a table of actions given in chart 8.

Just as for the events, each action comprises a mnemotechnical definition of the action, an identification number, a type of the action, a number of parameters, and comments relating to the action considered. In chart 8, 21 specific actions have been introduced in a nonlimiting manner, accompanied by two auxiliary actions corresponding to arithmetic operations under the conditions which will be given below:
- 1: Setbg,
- 2: PlayS,
- 3: PlayA,
- 4: PutInto,
- 5: AddTo,
- 6: GoScene,
- 7: BoBack,
- 8: DesigneOpt,
- 9: LounchApp,
- 10: QuitApp,
- 11: ShowObj,
- 12: HideObj,
- 13: SetTimer,
- 14: Selectserv,
- 15: StopTimer,
- 16: Mute,
- 17: Unmute,
- 18: gl_actn,
- 19: ReadUA,
- 20: Phone,
- 21: Nothing, The arithmetic operations are designated by Addto, Multo and Divto respectively and correspond to multiplication, respectively to division between two numerical integers. Other operators may be provided, such as Modulo, integer division remainder, subtracts subtraction, for computation operations, or Speak Writer for the management of a speech synthesis module, so as to introduce the concept of restoration of a voice from a text file and a voice.

The comments for actions 1 to 21 correspond to the mnemotechnical designation as given in chart 8 above.

Thus, with reference to the structure of each line of macroinstructions each comprising an execution position field, an event field, an options field, a list of conditions field and a Boolean halt variable field, it is indicated that, with reference to the execution position, the lines of macroinstructions are executed sequentially starting from position 1. Thus, with reference to the table of events, chart 7, and to the table of actions, chart 8, the action is executed under the control of the control structure mentioned previously in the description.

This control structure can be summarized as follows. If the condition is realized, then the action of the line of macroinstructions is then executed.

As far as the condition is concerned, it is indicated that this condition may consist of a comparison of strict equality, of superiority, of inferiority or equality, superiority or equality between two numerical values or between two values containing character strings.

In the case where the Boolean halt variable is not the value true, the driver executes the next line.

Otherwise, the driver halts the execution of the set of lines of constituent macroinstructions of the set of event/action pairs correlated.

It is indicated that the number of lines of execution, that is to say of number of lines of macroinstructions, is not limited.

A more detailed description of the structure of the data of any interactive application will now be given in the description.

With reference to FIG. 1c, it is recalled that an interactive application is composed of one or more scenes.

According to a noteworthy aspect of the system for developing interactive applications, which is the subject of the present invention, the data structures relating to a determined interactive application are defined on two distinct levels:
- an application level proper, defining the data structure common to all scenes;
- a scene level defining the data structure individual to a determined scene.

Each application comprises a structure characterizing the identification of an application, data structure designated by AP.

The aforesaid data structure AP is given in chart 9.

For each given application AP, the attributes of the application are defined by variables relating to the description of the application, to the name of the author and of mention of copyright, to the name of the application, to the version of the application and to the definition of the color palette used such as a default color palette or one defined for a determined scene, a data variable containing an identification number for the starting scene, in the absence of starting scene identification number the default value and the value of the menu are defined by HOME, a transparency color variable for the application and, for each access platform PL considered, a Boolean-type variable which, at the value true, indicates whether the application will have to be brought about for the platform PL considered.

In order to ensure a high degree of user-friendliness of the interactive applications developed, the set of color palettes used in an application is managed by a particular data structure PA, each scene being able to use a color palette.

The data structure PA defining a color palette is composed of n colors which are chosen from among a list of colors, denoted CO. In general, an application uses only one palette per interactive application considered. The list PA of palettes used by the application is defined in chart 10.

For each color palette managed by the interactive application considered, the latter comprises a variable identifying the color palette considered, a palette name variable for facilitating editing and a list of 15 colors in the absence of video transparent color in the case where the OPEN TV system is used, finally, a color identifier associated with a position in the palette considered. The names of the corresponding variables are indicated in chart 10.

Furthermore, a specific data structure, denoted BG, defines the background of a scene of the interactive application considered. By way of nonlimiting example, it is indicated that the types of background may consist of a color background, a video background, a still image such as a still image of MPEG2 type. Other types of background may be defined such as a background of compound type which can contain a still image in millions of colors, or a video background or a color background according to the palette used, as well as a set of objects or components having visual content, such as an image, a color graphic, a text or a color palette.

The data structure defining the background of a scene BG is given in chart 11.

The list of backgrounds which is used by the application is defined for each background brought about by a variable identifying the background, a background-type variable, a background value variable depending on the type and a specific variable, which is obligatory, if the type of background corresponds to that of an image of MPEG type for example, as well as finally a name of the background variable so as to facilitate editing. The aforesaid variables are defined by a corresponding mnemotechnical definition given in chart 11.

As far as the background-type variable is concerned, the latter can comprise several subvariables given in chart 12, such as a plain color, a transparency to the video signal, a background mpeg image or an image in point mode for example.

The content of the backgrounds which are used by an interactive application developed by virtue of the system for fast development, which is the subject of the present invention, as well as the content of the constituent objects of these scenes, calls upon media to actually constitute virtual objects or set of components mentioned previously in the description which, of course, must be present or will be present when the scene is composed or represented.

As far as the media are concerned, it is recalled that the latter, within the framework of the implementation of the system for developing interactive applications, which is the subject of the present invention, are defined as external resources and may be catalogued as a function of the audio or video player transmitting the information intended for the user according to the following types:

audio: resource name/coding attribute/memory size;
video: resource name/coding attribute/memory size;
text speech: resource name/speed attribute/memory size;
natural still image: resource name/memory size;
graphical image: resource name/memory size/color palette.

The data structure relating to the media ME is none other than a list of media which is implemented for the interactive application considered. The corresponding data structure is given in chart 13 for each medium managed by this aforesaid interactive application.

The aforesaid data comprise an identification variable for the medium, a type variable for the medium, an update variable, a Boolean-type variable, which, when it has the value true, makes it possible to return to the update, in the absence of a medium and, finally, a variable of usage when the medium is external, that is to say editable in utilization mode. Furthermore, for each platform or terminal for accessing the interactive application considered, platform PL, the aforesaid data structure comprises a reference variable for the medium in respect of a given platform, an internal structure variable, an identification variable for the reference, a recall variable for the platform of this reference and a format variable for the referenced medium, a physical size variable for the medium considered, a memory size variable with a view to preloading and a reference variable for the medium in respect of the platform considered. The platform can, as mentioned previously in the description, consist of a platform, that is to say of an access terminal of MacOS type, the complete access route on the disk being indicated, or of Internet URL type or of OPEN TV type, name of the file containing the medium considered, and finally a name of medium variable.

An interactive application developed in accordance with the implementation of the system, subject of the present invention, can often call upon variables whose content may vary during the running of the application. It may for example concern, for each scene indexed, a numerical value indexed from the value 1 in a counting variable. These variables constituting numerical variables for managing the application, and in particular the interactive nature thereof, are designated by variables whose data structure VA is given in chart 14.

With reference to the aforesaid chart, for each variable, it is possible to define at least one text-type variable, an identification variable for the management variable considered, an original value of the data item, a type of variable value and a name of variable value as well as lines of text or corresponding integer numbers. As far as the type of the variable considered is concerned, it is indicated that the latter, with reference to chart 12, can contain any character string of "txt" type or an integer number of "num" type.

The scenes of an interactive application call upon the definition of virtual objects described at the level of this application. The virtual object can be defined as a container whose characteristics and attributes will be described later in the description in conjunction with the description of the data structures relating to a scene.

According to a noteworthy mode of organization of the data structures of the system for developing interactive applications, which is the subject of the present invention, these data structures may advantageously comprise a list of interface, virtual, objects common to all the scenes. This list is designated by OC and the corresponding data structure is given in chart 15.

With reference to the aforesaid chart, for each common virtual object, the corresponding data structure can comprise a variable for describing the common object and a variable of unit structure for describing this object.

As far as the management of the constituent macrocommands of the high-level descriptive language for the application is concerned, it is indicated that the set of event/action pairs may be described by a data structure relating to the event/action lines attached to the interactive application considered, this data structure, for each line, and hence for each action of the application considered, designated as data structure AA, is given in chart 16.

In the aforesaid data structure, the event/action lines attached to the interactive application may advantageously comprise a serial number variable for the action, a variable describing the action relating to the application considered as well as a variable of unit structure for describing an action, as will be described later in the description.

A more detailed description of the data structures implemented for the description of a constituent scene of an interactive application developed by virtue of a system for the fast development of interactive applications, which is the subject of the present invention, will now be given in conjunction with charts 17 to 25.

By definition, an interactive application consists of a plurality of scenes, the scene considered being designated by current scene.

According to a first noteworthy aspect of the system for developing interactive applications, which is the subject of the present invention, it comprises a data structure for identifying the current scene, this data structure, denoted SC, being given by chart 17.

The aforesaid data structure contains the attributes individual to the current scene considered and may advantageously comprise an identification variable for the scene. There is always at least one scene, a reference scene, also designated the home scene, corresponding to a HOME page of the interactive application for example, a name of scene variable, a color palette variable, this variable possibly corresponding to the color palette variable of the application or to a different color palette variable, specific to the scene, an identifier variable for the background, a starting position of the cursor variable and, finally, a Boolean variable, which, when it has the value true, makes it possible to return to the last option of the scene considered.

In general, it is indicated that the two-dimensional composition of each current scene of the interactive application is performed on the basis of containers defining the virtual objects, as was mentioned previously in the description.

The description of a virtual object, that is to say of the aforesaid container and of its attributes, will now be given in conjunction with charts 18 to 24.

In general, it is indicated that the management of virtual objects implements a data structure comprising at least:

a table of objects whose data structure, designated by OS, is given in chart 18.

The aforesaid chart defines a list of interface objects for the current scene and can comprise, for each object, a variable describing the object and a variable of unit structure for describing this object.

The description of an object furthermore comprises a data structure relating to the set of event/action pairs for the current scene considered, this data structure being denoted AS and described by chart 19.

For each action of the aforesaid current scene, this data structure can comprise a serial number variable for the action relating to the scene, a variable for describing the action relating to the scene and a variable of unit structure for describing an action.

Furthermore, and just as for the application level, the data structure relating to the definition of the virtual objects of a scene can advantageously comprise a data structure defining a list of phrases in fact constituting a dictionary of the scene. This data structure, denoted PS, is written in chart 20.

The aforesaid data structure constitutes a list of phrases which are attached to the current scene and can comprise, for each of the corresponding phrases, a variable identifying the phrase considered, an origin of the data item variable, such as the name of the driver generating this data item and of the mode of read acquisition for example, a type of phrase variable, this type of phrase being for example of "txt" text type, a name of the phrase variable, a variable reserved for line skip and a line of text variable.

As far as the description of each virtual object relating to the scene or as the case may be to a considered application is concerned, a virtual object considered to be a unit structure, a detailed data structure allowing the description of this container or virtual object is provided so as to describe the corresponding virtual object, according to chart 21.

Each virtual object, defined according to the above data structure, constitutes a unit structure making it possible to define the description of an object relating to the current scene or, as the case may be, to an application, and can comprise for example an identification variable for the object, a level of display variable for this object, either as a background for the scene, or as a foreground, an object display type variable, the display type being said to be static when the object is an object relating to the application and possibly being either static, or dynamic when the object relates to the current scene of a considered application, an attribute variable depending on the display type, a type of object variable, an object name variable, preferably in the absence of any comma, and an object attribute variable depending on the type. The aforesaid container or virtual object also comprises a data structure defining the display attribute for this virtual object defined according to chart 22.

This data structure defines the possible values of the display attribute for the virtual object considered and can comprise a variable for conditionless direct display, a variable for display by way of the type actions, that is to say dynamic or static display, and a variable for display conditioned to the option number of the cursor on the display screen.

Likewise, a data structure relating to the description of the attribute of the content of the virtual object or container is described according to chart 23.

The aforesaid data structure consists of a list defining the type of object and possibly comprising a variable designating an image of point mode type, a graphical image brought about in the absence of external medium and a variable designating a text-type object.

Furthermore, a data structure makes it possible to define the position of the container in the scene according to chart 24.

The aforesaid data structure makes it possible to define the positions of the object as a function of the object type, the positions X and Y and maximum-width and maximum-height dimensions being defined with respect to the pixel number of the simulated display monitor MS, and hence eventually of the monitor of the platform or terminal for accessing the interactive application considered.

Finally, each current scene and as the case may be each application advantageously comprises a data structure descriptive of the event/action pair, this data structure allowing the description of a line of macro-commands, such as described previously in the description relating to the current scene or as the case may be to an application, according to chart 25.

This data structure may advantageously comprise an identification variable for the triggering event, a parameter variable for the event, the event possibly corresponding to one of the events as described in chart 7 introduced previously into the description for example, a variable of Boolean type for an event of continuous type, a default value then being allotted, an identification variable for the action to be triggered, a first and a second variable or parameters for describing the action according to the type of action considered. Furthermore, for each condition and so as to ensure the management of the aforesaid condition, the data structure comprises a reference variable referring to a condition and an internal structure comprising at least one identification variable for the condition, a variable for managing the condition according to the first digit and a value variable for executing the action.

The management rule for the event/action pair described by the above data structure is effected by way of the variable Act-Pass, and, at the value not true, the action corresponds to the Go-Scene action of chart 8, that is to say to the initialization of a scene or to the change of scene as mentioned previously in the description.

A more detailed description of particularly noteworthy elements of the system for the fast development of interactive applications, which is the subject of the present invention, will now be given in conjunction with FIG. 2 and the subsequent figures.

In general, it is indicated that these noteworthy elements consist of software elements whose screen pages, interface between the user of the system for the fast development of interactive applications, which is the subject of the present invention, with the user, exhibits specific functional characteristics related to the data structures described previously in the description.

Figure 2:
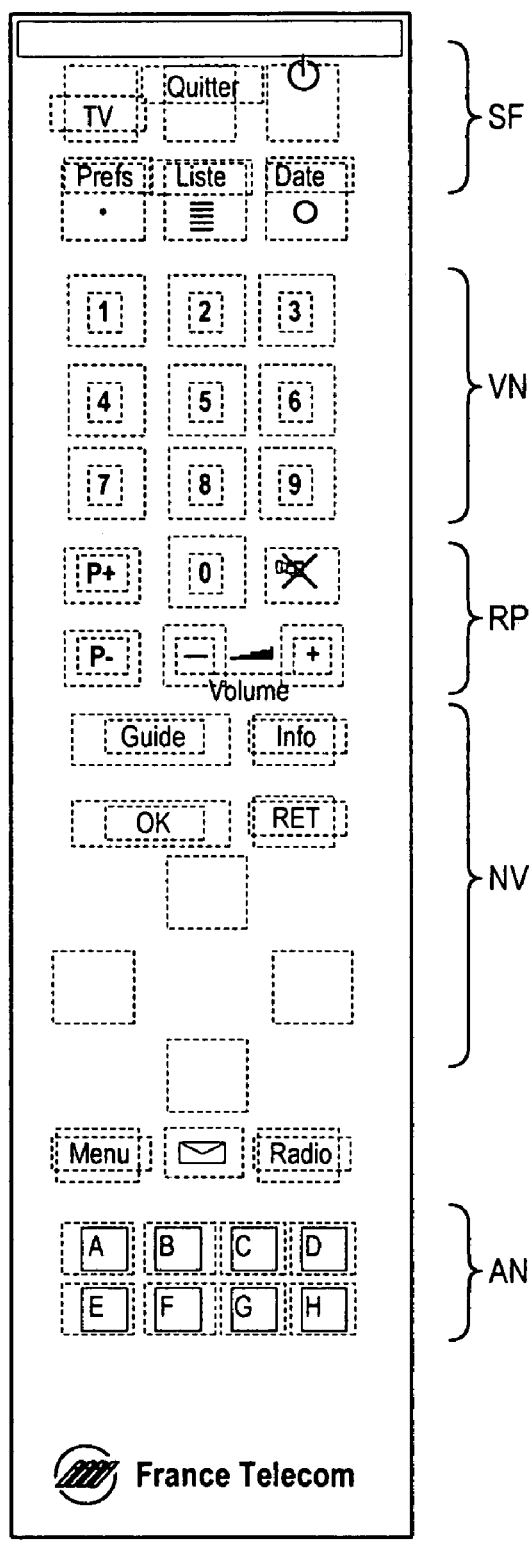
FIG. 2 represents, by way of nonlimiting example, the editing of a control interface for a control module of the television remote control package type.

In particular, in the case where the display monitor, the control module and the operating system of the target platform or access terminal are those of a television receiver, the electronic editor E allows the simulation of the display screen of this television receiver and of the control interface for a universal remote control module associated with this television receiver, as represented in FIG. 2.

Of conventional structure, the package with buttons comprising, as represented in the aforesaid figure, specific buttons for selecting functions, which is designated by SF, buttons for selecting numerical values, which is designated by VN, buttons for adjusting programs RP, up arrow, down arrow, right and left navigation buttons, denoted NV, and buttons for coding alphanumeric characters AN, menu and radio buttons for example, with the above keys of corresponding name are associated the events according to the lookup chart 26.

It is thus understood that with each corresponding key whose name is indicated in the chart and represented in the drawing is in fact associated an event according to the mnemotechnical designation of this event. Thus, for the management of the remote control module, consisting of a pack with buttons, with each button of this remote control may be associated an event from the list of events introduced according to chart 7. By way of example, with the button OK may be associated the event KeyOK or any other event such as AppliStart, TimerExpired for example. This management is carried out by virtue of a software module which makes it possible to perform cross assignments. The remote control module thus makes it possible to simulate any external module which might possibly produce an interaction.

When the control module and the operating system are those of a workstation or of a computer, the electronic editor E allows the simulation of the display screen of this microcomputer and of the control interface for a peripheral input apparatus of this microcomputer, such as for example the keyboard. With a specific key of this peripheral input apparatus is associated an event causing the breakage of equilibrium of the state of the operating system. It is understood in particular that the events mentioned in chart 26 may then be associated with specific keys of the aforesaid keyboard. In the same way as in the case of FIG. 2, when a universal remote control module associated with a television receiver is used, the mapping between events and keys of the keyboard is carried out in a software manner. Such mapping will not be described in detail since it corresponds to an operation of the same kind as in the case of FIG. 2.

A more detailed description of a set of constituent software tools of the system for the fast development of interactive applications, which is the subject of the present invention, will now be given in conjunction with FIGS. $3a_1$, $3a_2$, $3a_3$ to $3j_1$, $3j_2$.

The concept of software tool overlaps, in accordance with the subject of the present invention, a set of screen pages making it possible to construct in a particularly flexible manner the data structures described previously in the description. It is understood in particular that the aforesaid screen pages constitute an interface for the user of the system for the fast development of interactive applications, which is the subject of the present invention, so as to allow same to construct the data structures described previously under the format and interoperability conditions for these data structures required for constructing interactive applications of native type for example.

With reference to FIG. 1a, it is indicated that the electronic editor E, the virtual objects generating module GOV specific to the application and the control module for correlating a plurality of event/action pairs COR advantageously comprise a driver software module making it possible in particular, on the basis of a window for displaying a representation of the simulated control module MSC, and as appropriate peripheral apparatuses, to receive a corresponding variable "EVENT", as well as on the basis of a window for displaying constituent scenes of the interactive application under development, to cause either the initialization or the modification of the scene considered, by way of a variable "ACTION", as was mentioned previously in the description.

It is understood, however, that the driver software module comprises a plurality of software tools, each software tool being substantially associated with at least one display window allowing the development of the data structures described previously in the description by the user of the system for the fast development of interactive applications, which is the subject of the present invention.

The essential windows associated with the corresponding software tools will now be described in conjunction with FIGS. $3a_1$ to $3j_2$ below.

According to a first noteworthy aspect of the system which is a subject of the present invention, it comprises a tool for creating macroinstructions, which comprises at least one screen page for correlating event/action pairs, the set of essential screen pages which is associated with the aforesaid tool being represented in FIGS. $3a_1$, $3a_2$ and $3a_3$.

With reference to the aforesaid figures, it is indicated that the successive screen pages comprise at least one window for displaying a set of events, designated as list of Ev/Actions, a window for displaying a triggered action associated with one of the events of this set of events and at least one window for parameterizing the triggered action, these windows being denoted Param 1, Param 2 in the aforesaid figures. A pointing and selection device, such as for example the pointer controlled by a mouse, is provided, this device being managed by the operating system of the constituent host microcomputer of the fast development system which is the subject of the present invention. Thus, the correlating of event/action pairs can be performed by selecting an event from among the set of events and the action by way of pointing.

Represented in FIGS. $3a_1$, $3a_2$ and $3a_3$ is the successive selecting from the List of Ev/Actions window of an event represented by the mnemotechnical designation of the events, as given in FIG. 2 or in chart 7 mentioned previously in the description. The action can then be performed by selecting from the triggered action window an action such as the action designated by GoScene. In FIGS. $3a_1$, $3a_2$ and $3a_3$, the various windows are linked by continuous lines to the fields of the macroinstructions or lines of instructions making up the scripts. FIG. $3a_1$ thus represents the creation of the line of script 1, FIG. $3a_2$ that of the creation of the line of script 2 and that of FIG. $3a_3$ that of the line of script 3 on the basis of the events displayed in the list of Ev/Actions window and selecting of each event successively, then of the corresponding action, as well as parameters in the windows Param 1 for example.

The macroinstructions creation tool described previously thus makes it possible to bring about the data structure corresponding to the macroinstructions and to manage the conditions of triggering of the actions thus programmed. In edit mode, the aforesaid tool also makes it possible to delete the conditions of triggering, to erase a line of macroinstructions through the Delete button. This tool thus performs an autocorrelation on the parameters as well as on the fields, the choice of the parameters in the Param 1 and Param 2 parameter windows being proposed only by way of menus only when they exist as parameters of the action field.

Likewise, the type of the data item introduced into the Param 1 window imposes a directive choice in the Param 2 window. By way of example, if the Param 1 window is loaded with a variable of text type, the Param 2 window can only be of the text type and the editor therefore proposes only values of the same type.

By virtue of the implementation of the aforesaid tool, the programming errors are thus minimized, the user/designer being unable to write a nonexecutable line of macrocommands. Finally, the lines of macrocommands are hierarchized, line 1 always being executed first. When the GoScreen action is chosen in the triggered action window, such an action automatically causes the halting of execution of the macrocommand.

The driver module also comprises a software tool for creating virtual objects whose essential screen pages are represented in FIGS. $3b_1$ and $3b_2$.

As represented in the aforesaid figures, the tool for creating virtual objects comprises at least one screen page for creating objects comprising at least one window for displaying a list of accessible objects. This list of system objects corresponds to a list of interface objects and is displayed as a succession of these objects and a level field, the succession of objects constituting an objects designation field. Furthermore, the aforesaid creation screen page comprises a window for choosing mode of display/representation of this object, a field of object type making it possible to discriminate the nature of this object, a window of object type making it possible to bring about a field of object type making it possible to discriminate the nature of this object, as well as a window relating to a set of parameters dependent on the medium of display/representation of this object, this window being represented in FIGS. $3b_1$ and $3b_2$ by auxiliary windows, windows of position X, Y, of height and of width of the medium considered.

Represented in FIGS. $3b_1$ and $3b_2$ is the concrete definition of two objects, the mapping between the elements introduced on the basis of the objects creation software tool and the corresponding data structure, and in particular the OC-(AllData) data structure described in chart 15 previously in the description.

Furthermore, as represented in FIG. $3c$, the driver module comprises a tool for editing the media comprising at least one Media screen page window comprising at least one window for displaying a list of execution platforms, a window for displaying a list of specific media capable of intervening in the composition of a scene, each medium being defined by a name and an attribute, the attribute allocated to a given medium making it possible to discriminate the internal or external nature of the medium with regard to the application considered.

With reference to FIG. $3c$, it is indicated that the medium-editing tool thus allows the addition of a medium through the Add button or the deletion of this medium when the medium is no longer used in the objects or in the backgrounds making up the interactive application considered. This tool thus makes it possible to characterize the medium, its name and its attributes and the loading of the media attribute can be of the "ap" or "sc" type if the type of the medium is a digital-video image of Mpeg type, the type "ap" indicating that the medium is included in the application and the type "sc" indicating that the medium is external to the application and will be captured if need be during the presentation of a scene.

With reference to FIG. $3d$, it is indicated that the driver module can also comprise a backgrounds-editing tool, this tool making it possible to add and to delete backgrounds if necessary and to assign the data according to the backgrounds data structure as described in conjunction with charts 11 and 12 mentioned previously in the description.

As represented in FIG. $3e$, the driver module advantageously comprises a tool for editing phrases in the form of text file, each phrase comprising an identification number making it possible to assign this phrase, either at the level of the interactive application undergoing development, or at the level of one or more constituent scenes of this application. It is understood in particular that the aforesaid software tool makes it possible essentially to capture text, designated as phrase, corresponding data of phrase type being assigned to the application level or to the level of each constituent scene of the latter.

Figure 3C:
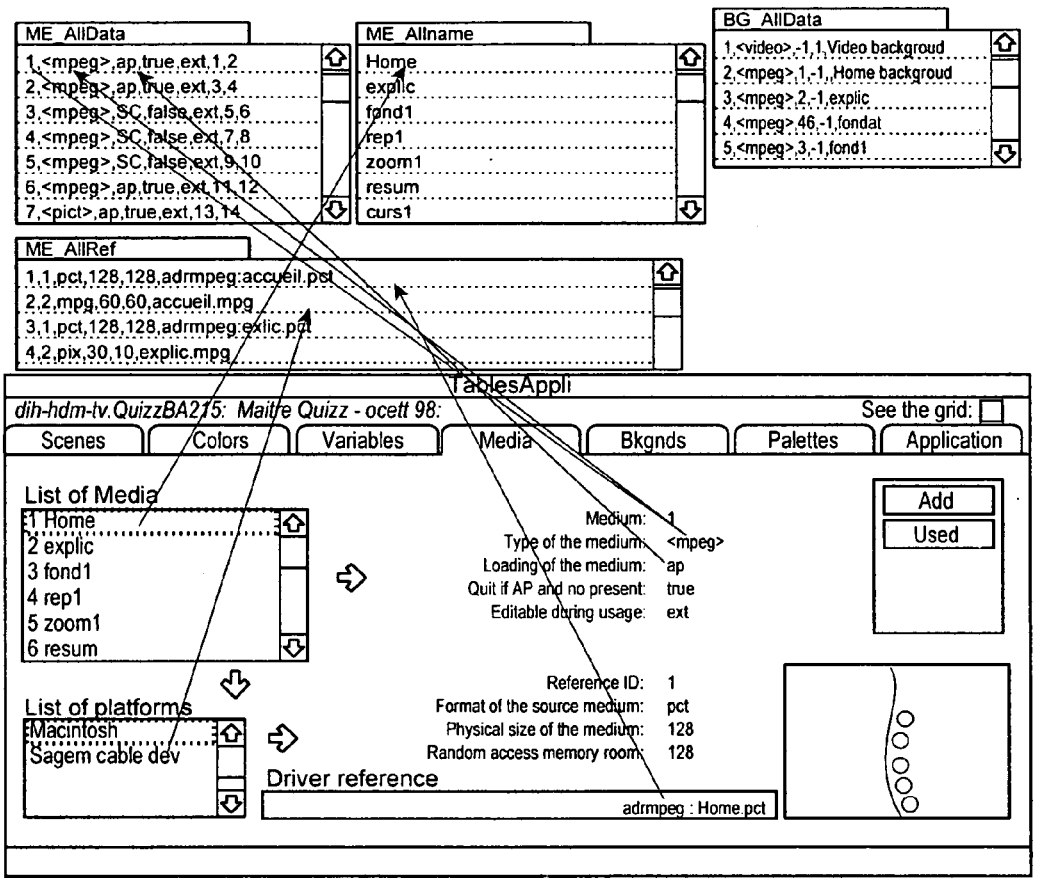
FIGS. 3$a_1$ to 3$a_3$ represent, by way of nonlimiting example, a software tool for creating instruction macrocommands.
Figure 3D:
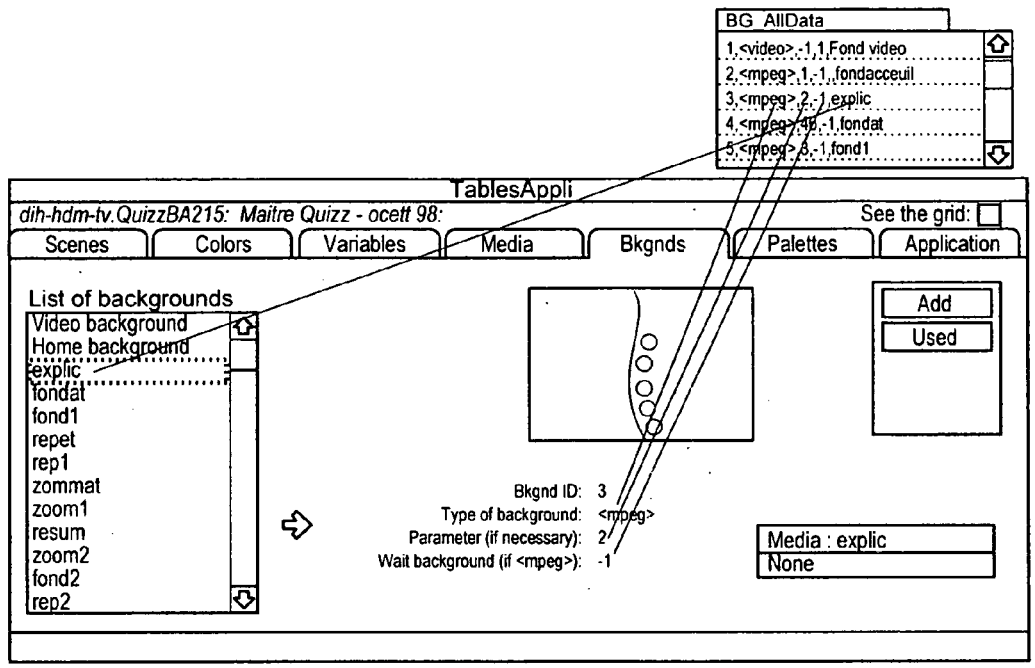
Figure 3E:
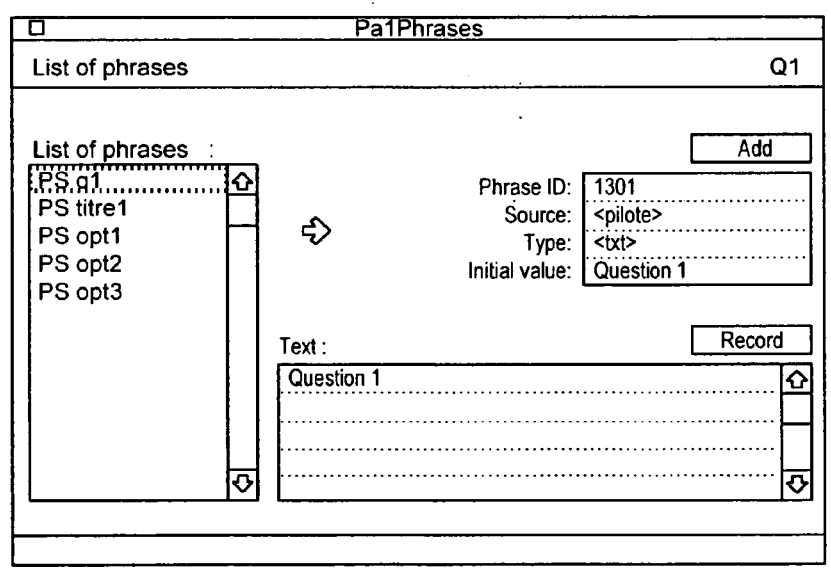
Figure 3F:
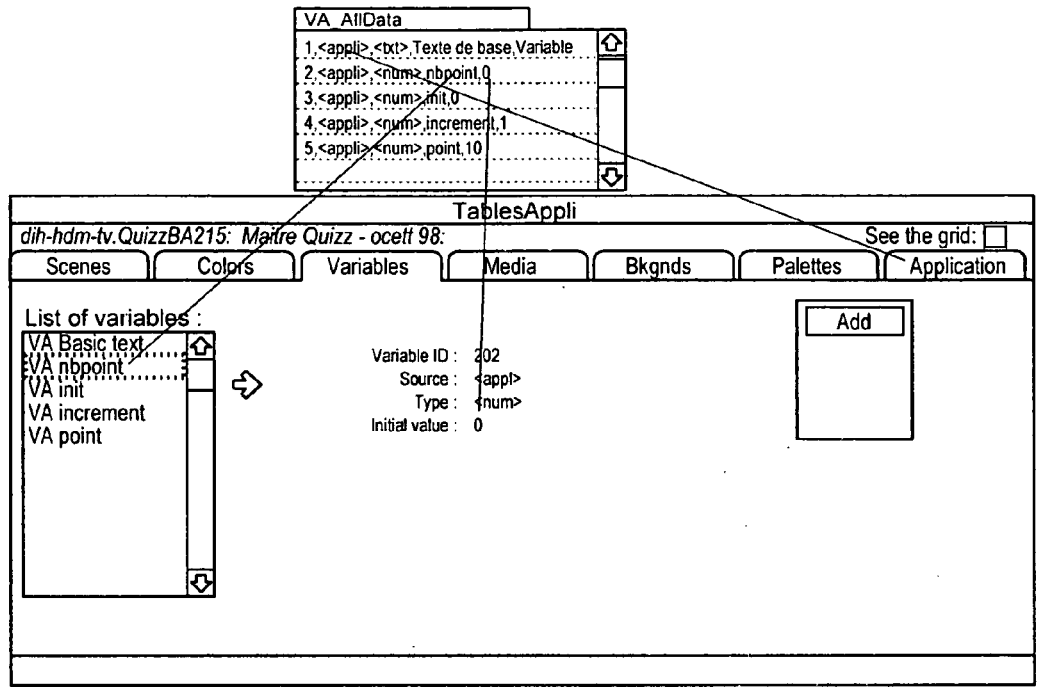

Likewise, with reference to FIG. 3f, it is indicated that a software tool for editing variables can be provided, this tool making it possible to create or to delete if need be variables of text or numerical content, these variables being structured according to the VA_(AllData) data structure introduced previously in the description in conjunction with chart 14.

Figure 3G:
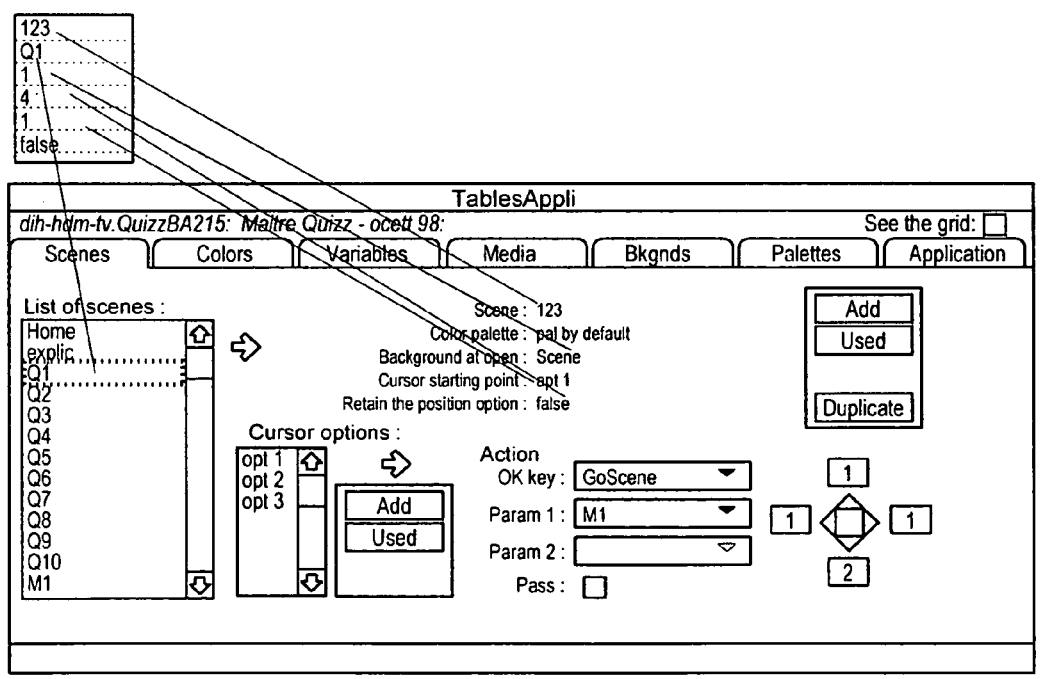

According to a preferred embodiment of the system for developing interactive applications, which is the subject of the present invention, it is indicated that the driver module can also comprise a scene creation software tool comprising at least one window for displaying a list of standard scenes, as is represented in FIG. 3g, each standard scene being tagged by a specific designation. Furthermore, a window for defining parameters of the chosen scene can be provided, parameters such as scene identification number, designated by Scene ID, color palette, choice of background on initialization of the scene, designated by Background upon open-Scene, Starting position of the cursor, and a window for choosing Options for the cursor considered.

The software tool for creating scenes makes it possible to create a new scene, respectively to duplicate or to delete an existing scene. When duplicating a scene, all the data relating to the scene are copied over to the level of the duplicated scene.

As far as the options such as the cursor options mentioned previously in conjunction with FIG. 3g are concerned, it is indicated that the driver module also comprises a software tool for defining options in a scene whose screen pages are represented in FIGS. $3h_1$ and $3h_2$.

In general, it is indicated that the aforesaid tool makes it possible, on the basis of a list of defined options for the scene considered, in particular the cursor options, to allot an option determined from among the list of options and to navigate and choose an auxiliary option around the option allotted on the basis of a set of control buttons of the control module associated with the display monitor. It is understood in particular, with reference to FIG. 2 for example, that the control buttons concerned may advantageously be vertical shift buttons, up, down, right, left belonging to the group of navigation buttons NV, as is represented in FIG. 2 and in chart 26 introduced previously in the description.

It is understood in particular that by virtue of the aforesaid software tool, it is thus possible to allot a start option to the construction of a scene, then subsequently to navigate by way of the preconfigured buttons, arrows, or to choose another option by choosing a button of the keyboard or an event coupled to the action for designating a DesignOpt option.

The aforesaid software tool can also advantageously include the direct execution of the action, offered from among all the actions offered, and coupled with the option designated if the event Keyok is triggered. An analogy of operation with the double clicking of a button of the mouse of a microcomputer can be demonstrated.

Two specific illustrative examples will be given below.

EXAMPLE 1

Creation of an animation of virtual objects. Each object has a display attribute of option type and an option number from 1 to 10. The sequential selecting of each option therefore makes it possible to scroll the objects behind one another and thus to restore a kaleidoscope of objects.

EXAMPLE 2

Creation of a cursor on the screen which manifests a designation and a selection via the pack with buttons, by using four arrows.

Consequently, the allotted option in fact constitutes a display parameter for the virtual object thus constructed, thereby making it possible to endow the interactive applications developed by virtue of the system, which is the subject of the present invention, with very great flexibility and very great versatility of use.

Figure 3I:
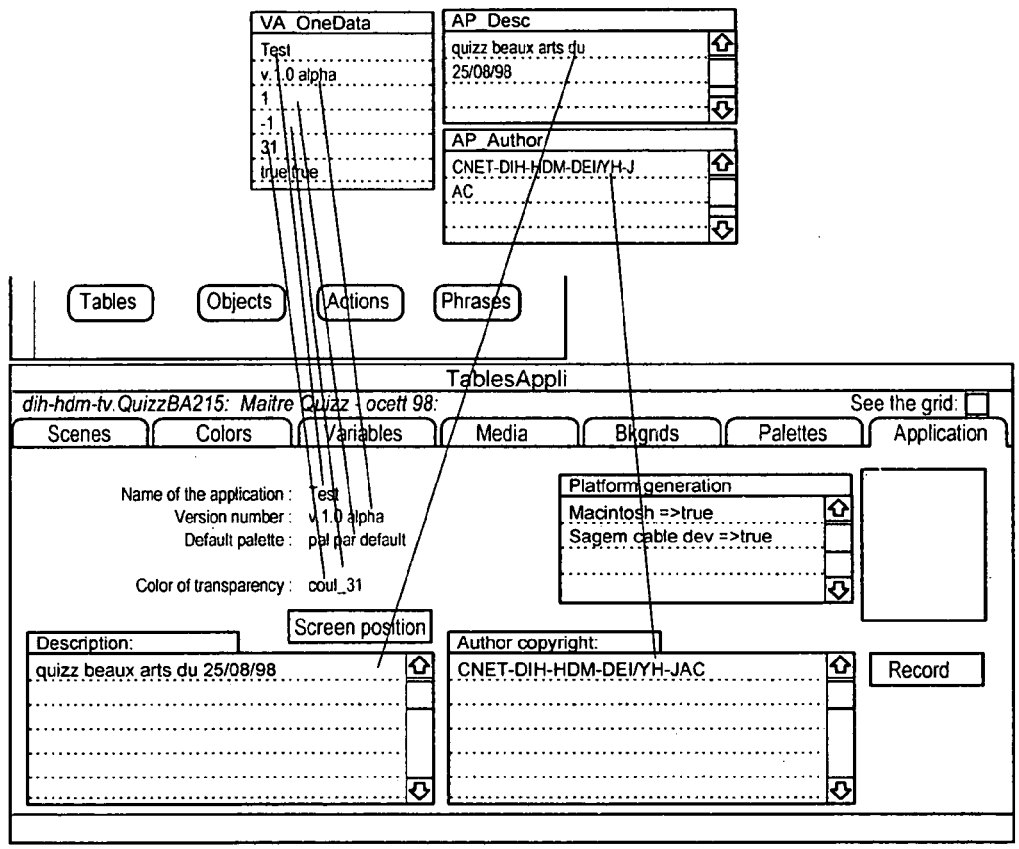

Likewise, in order to characterize each interactive application developed by virtue of the system, which is the subject of the present invention, this characterization being aimed equally at characters specific to the content of the application, to the version number of the application and its upgrades as well as to rights, in particular copyrights relating to this application, the driver can advantageously comprise a tool for issuing attributes of a determined application, these attributes comprising at least one application descriptive comment field, a field for designating the author of the application, an application name field, an application version number field and an application color palette field for the application considered, as represented in FIG. 3i.

According to a particularly noteworthy aspect of the system for developing interactive applications, which is the subject of the present invention, for each of the application execution platforms, it comprises a set of data tables common to the execution platform/application pair and a tool for consulting the common tables making it possible to consult the aforesaid common tables, manipulated in the editor E, for the defined access platforms.

The set of common data comprises at least:
 a table of application data relating to the platform considered;
 a table of characteristic data for each platform;
 a table of events relating to the access platform considered;
 a table of application actions relating to this platform;
 a table of fonts available for the access platform considered.

The table of common data can be defined for each application, with the editor E being associated a particular text file which contains a descriptive of the manipulated data.

Such a text file, dubbed ADR_Data, can be edited by a straightforward text editor and makes it possible to bring about external data. Modification of these data entails, by way of the editor E, an updating of these data in the currently open application. When the application is opened, a copy-over of these data items is performed from the editor in the application.

An example of the content of the ADR_Data file is given below in chart 27.

In this mode of implementation of the data structure represented in chart 27, the first three lines define data manipulated through APIs, the initials standing for Application Protocol Interface. The first two data items are intrinsic to the driver ADRTVnum, TheKeyNum making it possible to identify a key of the keyboard and TheCurOpt making it possible to identify the current option number. The CurTime through a specific API for each access platform makes it possible to identify the current time. Extensions may of course be provided such as data defined in the DVB system or data related to a system for access control by way of a microprocessor card or a modem.

These data items manipulated through the driver module are invariant and hence static, but restored dynamically on an access platform of the television receiver type for example.

An example of creating a corresponding data structure such as represented in chart 6 previously in the description in respect of the data designated by the DO_AllData data structure is represented in FIGS. $3j_1$ and $3j_2$ below, FIG. $3j_1$ allowing the mapping of the data table and of the lists of platforms on the basis of the Data_ID data identification values, the origin of the update of the data, type of the data item and current value, and of parameters relating to the platform used, the MACINTOSH platform in the case of FIG. $3j_1$ and parameters relating to this platform, and FIG. $3j_2$ representing the windows relating to the screen pages, to the actions, to the events and to the fonts, as was mentioned previously in the description.

Whereas the set of data structures and of macroinstructions which is developed as described previously by virtue of the implementation of the system, which is the subject of the present invention, constitutes a native interactive application, that is to say an interactive application whose set of correlated event/action pairs and of successive constituent scenes of this application, have been defined generically for any type of terminal for accessing the interactive application considered, of course, the system, which is the subject of the present invention, furthermore comprises a module for translating the aforesaid native interactive application to an interactive application dedicated to an access terminal of determined type.

It is understood in particular that the native application being described as mentioned previously, it is then necessary to bring about a new description of the application allowing the representation of the latter in the format of the language of the driver of the target platform or access terminal.

As mentioned previously in the description, the module for translating the native interactive application can consist of various submodules of programs allowing the translation of this native application into an interactive application dedicated to a terminal of OPEN TV, MAC-OS type or HTML document, or any other operating system.

A more detailed description of the general organization of the creation of a native interactive application then of the translation of the latter into a dedicated application of OPEN TV type on the basis of the data structures previously described will now be given in conjunction with FIGS. 4a and 4b.

Figure 4A:
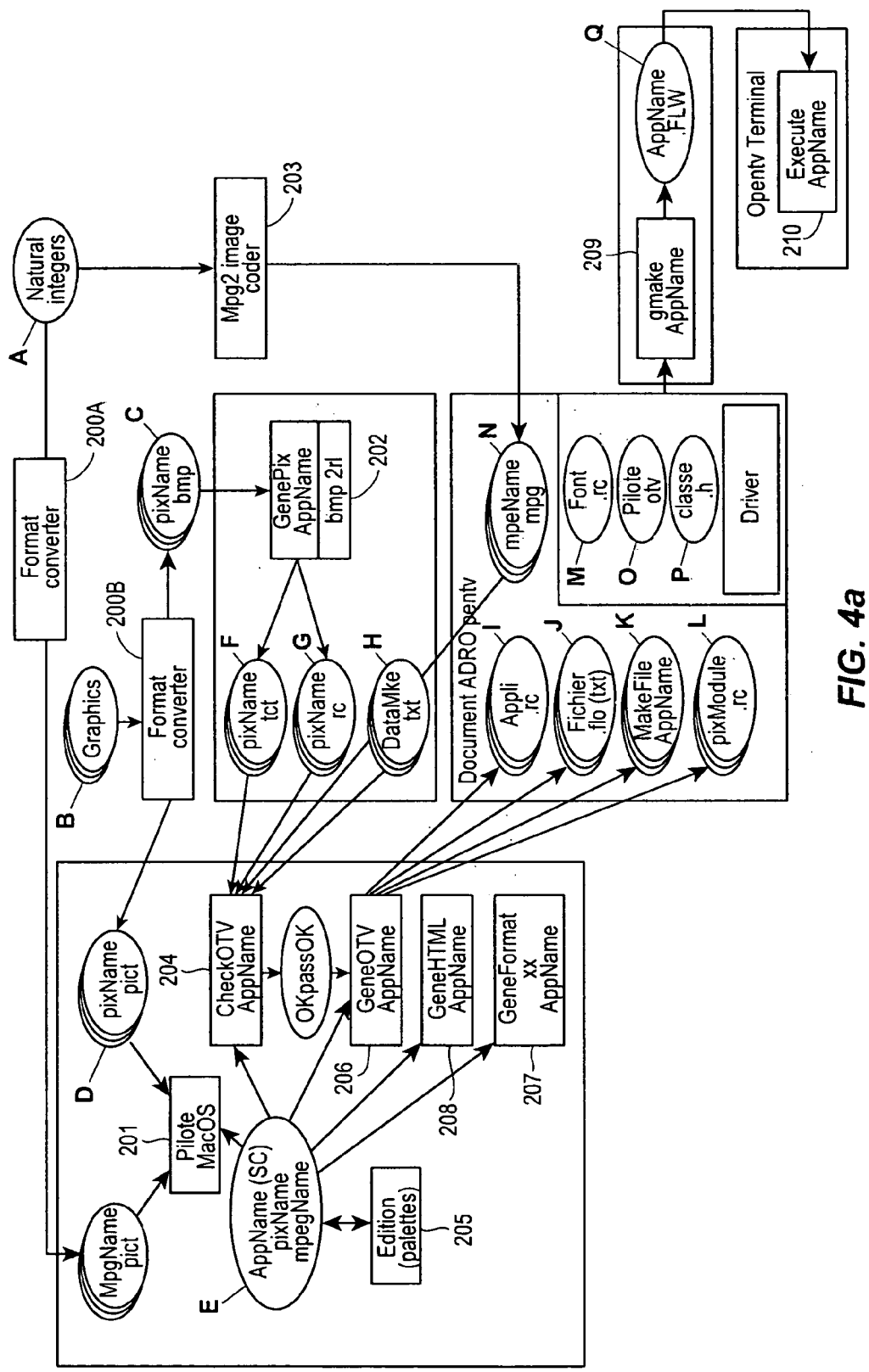
FIG. 4$a$ represents, by way of purely illustrative example, a functional flowchart for creating an interactive application for an operating system of the OPEN TV type on the basis of data structures obtained by virtue of the implementation of the development system which is the subject of the present invention as described in conjunction with the above figures, these data structures constituting a native interactive application, capable of being translated into one or other of the formats of the operating system of the target system or platform for accessing this interactive application.

Represented in FIG. 4a is the general organization of the creation of the application on the basis of the original files and of the auxiliary current files represented by ovals on the basis of modules for executing programs represented by rectangles.

In the case where the application comprises graphics and natural images, the media represented by files A and B and their respective transformation are necessary for each driver considered. The transformations of formats on the basis of natural images are operations performed by converters of format external to Workshop ADRTVNum. A format converter 200A is provided for transforming the natural image represented by the file A into a file A' for an image representation through the MacOS driver. A format converter called Mpg2 image coder, here called the program module 203, is necessary to transform the natural image represented by the file A into file N for an image representation through the Opentv driver.

Within the framework of the transformation of so-called graphical images, a format converter 200B is necessary for the transformation of a graphical image B into a format represented by the file D for the MacOS driver and a file C for the Opentv driver. A software module 202 makes it possible, on the basis of the file C, to bring about a file F descriptive of the object constructed by the aforesaid image, exact size of the medium in the Opentv format after final transformation, table of colors, and a file G by coding the original image by an Opentv specific coding. The files F and G bear the names pixName.txt and pixName.rc respectively.

The file H, called Datamake.txt, constitutes the model file making it possible to generate a broadcasting file called Q in Opentv.

When completeness is noted, that is to say when the presence of the various files is necessary for the proper operation of the generation, has been verified, a specific program module allows the creation of descriptive files for the application in respect of a determined operating system. The descriptive files bear the references I, J, K, L in FIG. 4a and the aforesaid program modules bear the reference 206 for an Opentv application, the module 208 allows a generation for an HTML document application and the module 207 for any format.

On the basis of the aforesaid files I, J, K, L and of auxiliary files such as fonts used, files M, the MPEG N image files established on the basis of the module 203, of the driver file O and of the file P of generic description class for all the applications, a program module 209 makes it possible to ensure compilation into a file U constituting a dedicated interactive application ready to be distributed. A program module 210 allows the execution of the application represented by the file Q. The MPEG N image files can lie at the same level as the file G, so that Checkoptv makes it possible to verify their presence.

Figure 4B:
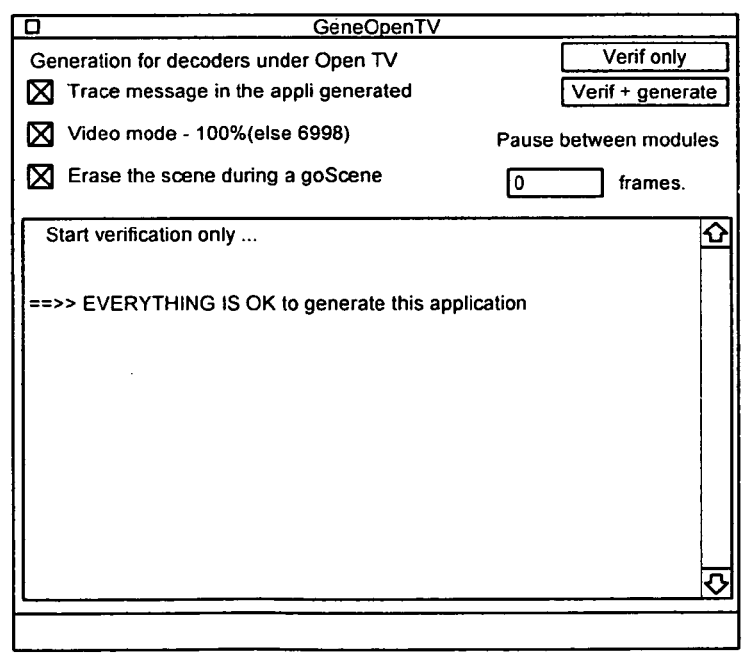

In the case of an application dedicated to the OPEN TV system, a specific generation tool is provided at the level of the editor E, a screen page of which is represented in FIG. 4b. This tool makes it possible in particular to bring about simplifications of implementation geared to OPEN TV access terminals such as:

trace message: when the matchup box is ticked, this makes it possible to activate a trace function within the application software with display of the descriptor, descriptive comment field for an application, author field for the application, remaining memory size, remaining continuous memory size for example;

video mode: depending on the versions of embodiment of the OPEN TV access platform, the inlay area is more or less restricted;

erase the scene: makes it possible to avoid the visual effects between the erasure of a scene and the construction of the new scene;

pause: makes it possible to manage the inter-module times and influencing the construction of the data stream construction file, the file J.

A more detailed description of a manager for developing cyclic-broadcast interactive applications accessible in particular on a TV channel from an access terminal furnished with a TV decoder will now be given in conjunction with FIGS. 5a and 5b.

If the memory capacity of the decoders, in particular of the TV decoders, is limited, it is necessary to implement a prediction process whose object is to act on the acquisition of the media of the program data geared to the construction of the future scenes of a given application.

It is recalled firstly that the virtual objects are containers which contain media contents or multimedia contents, that is to say in fact distinct objects.

Figure 5B:
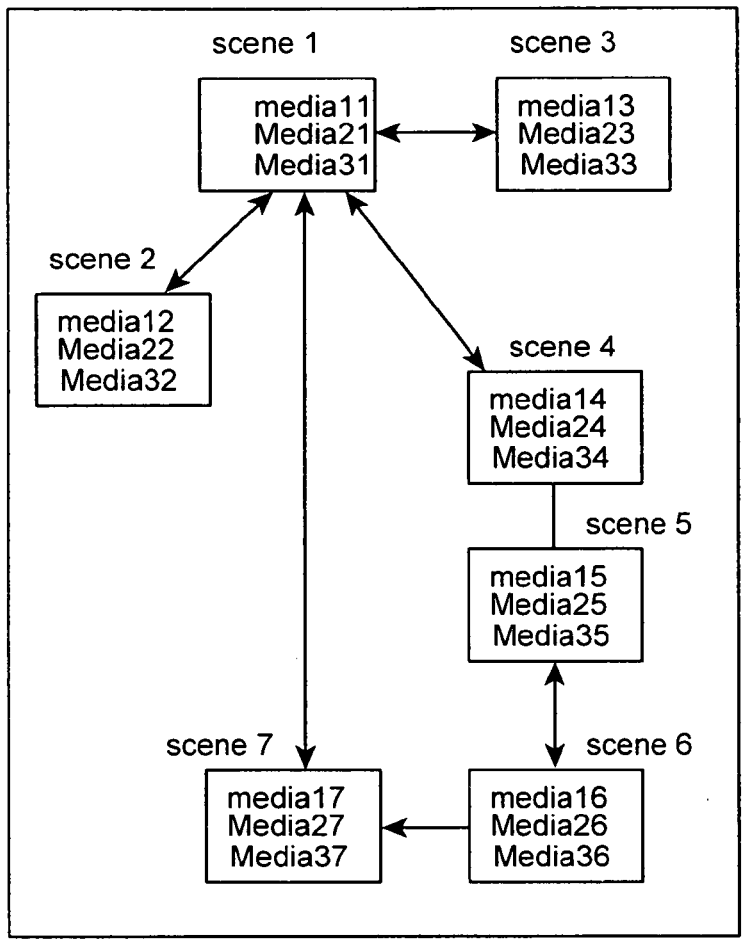
FIG. 5$a$ represents, by way of purely illustrative example, a module for utilizing and for acquiring constituent objects or components of each scene of an interactive application, which module is more particularly adapted for the cyclic broadcasting of this interactive application on a television channel, this utilization and acquisition module making it possible to optimize both the quantity of memory space required and the time to access this interactive application at the level of a platform or of a target access system of determined type.
Figure 5A:
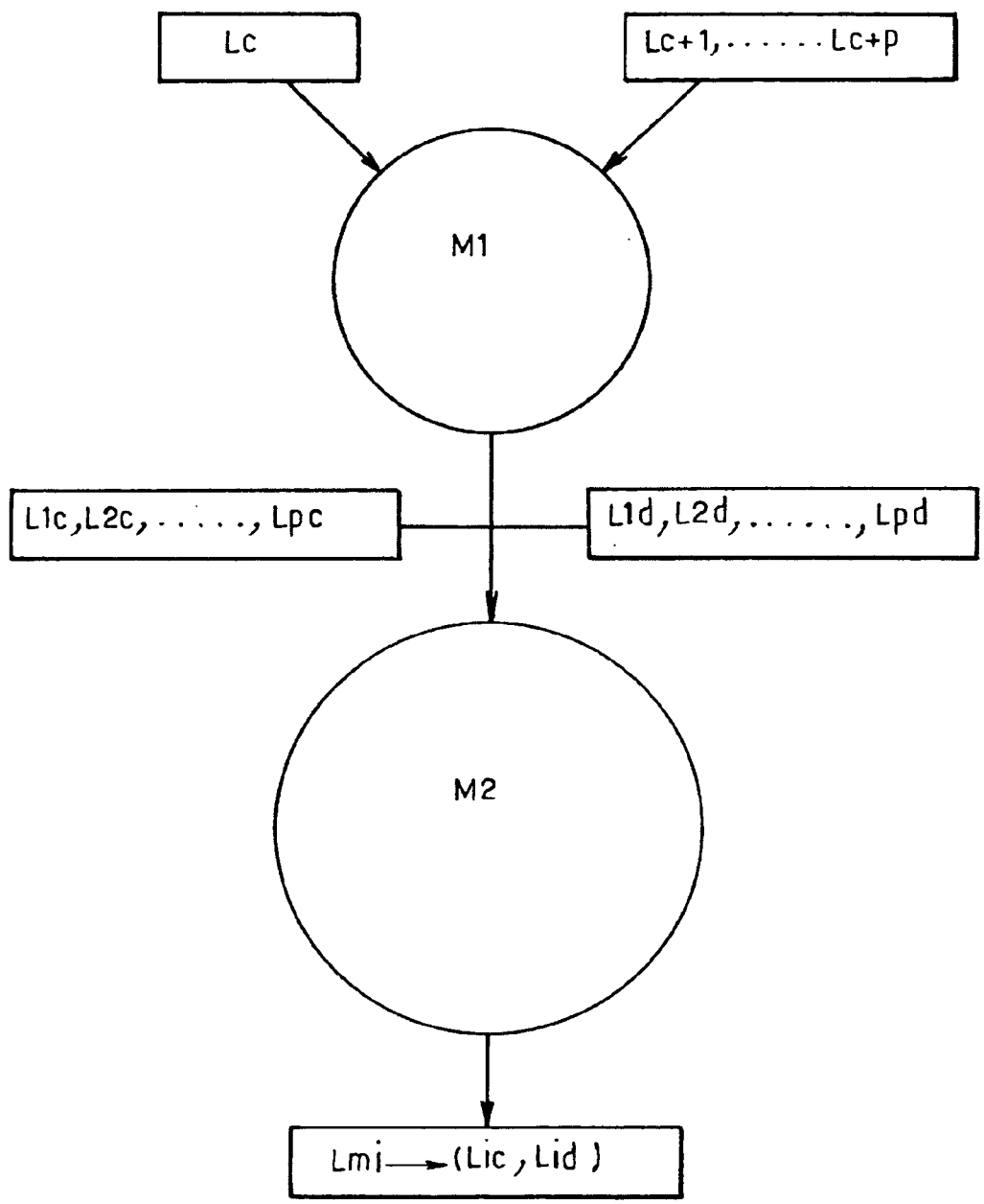

As represented in FIG. 5a, the system which is the subject of the present invention comprises at least for this purpose a software module $M_1$ managing a plurality of successive constituent scenes of this application, according to a depth level for each scene with regard to the current scene. The manager software module $M_1$ makes it possible to analyze and to discriminate over a determined number of successive scenes neighboring the current scene common virtual objects and the common media associated with these objects of these successive scenes, from the distinct virtual objects and distinct media associated with these objects of these successive scenes.

According to a nonlimiting embodiment, it is indicated that the virtual objects and the corresponding media for each scene considered may be constructed according to a computerized list on which the operations of the software module $M_1$ may be performed. Thus, the list of virtual objects and of media which relates to the current scene is denoted $L_c$ and the list of virtual objects and of media which relates to each successive scene of rank 1 to p neighboring the current scene is denoted $L_{c+1}, \ldots, L_{c+p}$.

Through computerized operations similar to set truncation and union operations applied to the aforesaid lists, the manager software module $M_1$ makes it possible to deliver lists designating the common virtual objects and the common media associated with these objects of these successive scenes, these lists being denoted $L_{1c}, L_{2c}, \ldots, L_{pc}$ for the common lists. By way of nonlimiting example, the aforesaid common lists may be determined by the operation of truncation between the current list $L_c$ and the following common list $L_{c+1}$ and successive updating. A plurality of current lists $L_{c+1}$ to $L_{c+r}$ with r>p may be taken into consideration so as to optimize the calculations. Likewise, the manager software module $M_1$ makes it possible to calculate the distinct lists of virtual objects and distinct media, denoted $L_{1d}, L_{2d}, \ldots, L_{pd}$ by an operation of disjunction between the current list $L_c$ and the successive lists $L_{c+1}, L, \ldots, L_{c+p}$. In the same way as in the case of the common lists, distinct lists may be made for the current list on the basis of a plurality r of successive lists $L_{c+1}$ to $L_{c+r}$, r<p.

As represented furthermore in FIG. 5a, the system also comprises a software module $M_2$ for updating the virtual objects and common media and virtual objects and distinct media for at least one successive constituent scene of the plurality of these successive scenes with respect to the current scene. As represented in the aforesaid figure, the updating software module $M_2$ receives the common lists and the distinct lists mentioned previously.

It is thus understood that, on the basis of these latter, the updating software module $M_2$ makes it possible to calculate each updating list, denoted $L_{mi}$, on the basis of each successive common list $L_{1c}$ and of each successive difference list $L_{id}$.

The aforesaid lists satisfy the symbolic relation:

$L_{mi} \leftrightarrow (L_{ic}, L_{id})$.

A specific exemplary implementation of the software module represented in FIG. 5a will now be given in conjunction with FIG. 5b.

In general, it is indicated that the multimedia data or the media considered are loaded into containers suitable for broadcasting. These specific containers are designated container modules. Furthermore, the software of the interactive application considered is also packaged into one or more container modules. The container module necessary for managing the first scene of the multimedia application considered is called the main module. This module must be captured first by the terminal so as to allow the representation of the first scene of the interactive application. A container module can contain several media or multimedia but strictly of the same type. The size of the container module of each type is fixed by the editor, that is to say by the tool or system for the fast development of interactive applications, which is the subject of the present invention.

The degree of depth of a scene of the application designates the level of this scene with respect to the current scene. By convention, in the example given in relation with FIG. 5b, it is indicated that the zero level designates the current scene present on the screen, level 1 the next scene contiguous with the current scene, the various successive levels 2 to p being defined thus.

A functional analysis of the application and the implementation of a predicate relating to the need to store or otherwise each medium and each virtual object then makes it possible to optimize the storage and the storage capacities required for conducting the representation of scenes.

The parameters required for the analysis are as follows:
memory size allocated to an interactive application downloaded into a terminal;
structure of the interactive application and in particular tree and content of each scene;
memory size of each broadcasting container per type of medium;
number of analysis levels, that is to say r, for each scene.

The process, and in particular the manager software module $M_1$, analyzes the tree structure of the application and constructs for each successive scene a broadcasting tree containing all the scenes from level 0 to p.

At each scene of level 0 are constructed the lists of the various routes corresponding to the different possible future output scenes, that is to say of level 1.

With each scene of level 0, an analysis of the containers is performed and to each container is assigned a storage variable of the form:
0: acquisition when the scene is open;
1: acquisition when the interactive application is downloaded;
2: management by the automaton.

The 0 or 1 assignment is proposed by the development system, which is the subject of the present invention, to the designer of the application, by way of the editor E and of the interactive screen.

With each scene of level 2 to p, an analysis of the broadcasting containers is performed and to each of the latter is assigned a storage variable of the form:
1: the broadcasting container must be acquired when the current scene is represented;
0: the container must not be acquired when the current scene is represented.

The above assigning of the 0 or 1 values is performed in a global manner, for each scene of level lying between 2 and p, or for a number of scenes r, as mentioned previously in the description.

Thus, a first analysis and broadcasting containers acquisition strategy pass is performed. During this pass, the manager software module $M_1$ thus constructs the list of containers required for each scene and a second pass makes it possible to complete this list and to determine the broadcasting modules according to the acquisition strategy so as to optimize the memory occupancy of a module. The memory size occupied at each scene by the set of modules is thus known.

As a function of the memory size available in the access terminal, the designer of the application can thus refine his strategy and make a compromise between the speed of display of a scene with all its broadcasting containers and the memory size allocated to the multimedia containers.

The memory size of the interactive application required for the downloading is thus optimized: the smaller this size, the shorter is the wait time for the appearance of the first scene of the appearance. The above analysis can also be adapted so as to know the necessary resource in terms of throughput for a considered interactive application.

According to a noteworthy aspect of the system which is the subject of the present invention, with each change of scene, the driver of the access terminal verifies, by way of the updating software module $M_2$, whether the broadcasting containers to be acquired are not already in memory. The memory space for the unnecessary null words is thus freed.

FIG. 5b represents the successive relations between the scenes of an interactive application given by way of non-limiting example and composed of seven scenes.

Each scene is deemed to contain three media of different type, the media, for each scene, being defined by a medium index and a scene index, the notation medium jk thus designating the medium of rank j used in the scene of rank k.

Each scene in FIG. 5b is deemed to comprise three media of different type. With each scene of level 2 to p, acquisition is not requested for each medium.

The chart resulting from the analysis of the interactive application corresponding to the example given in FIG. 5b is chart No. 28 in the appendices.

By way of simplification, chart 28 has been deliberately reduced to four levels. Finally, in chart 28, the scene index k has been deleted but the value of the binary variable, acquisition or otherwise of the container, has been mentioned.

By way of simplified nonlimiting example, each medium being of the same type and being deemed to require a memory space of 30 kbytes, the memory size necessary to manage, in the example of FIG. 5b, a level 1 tree is 12×30=360 kbytes.

Appendices

CHART 1

(100, 101) →102; (105, 102, 104) →106; 103→104;
(107) →108; (109, 110, 106, 108, 111, 116, 117, 113) →114;
(116, 111) →115; (111) →116; (116) →117;
(117, 116, 115, 111, 108, 104, 102, 112, 118) →113;
(114) →119.

CHART 2

| PL | | Table of target platforms | | |
|---|---|---|---|---|
| PL_MaxTextSize | 255 | Max nbr of characters for the texts (var/Don and phrases) | fld PL_MaxText | |
| For each PL | | | fld PL_AllData | 1 line |
| PL_Ident | | Platform identifier | | item 1 |
| PL_Name | | Platform name | | item 2 |
| PL_Nbr_Col | num | Max numbers of colors of the palette (note: OpenTV:15) | | item 3 |
| PL_RamMedia Max | Kbyte | Max memory (for loading of medium) | | item 4 |
| PL_FileMedia Size | Kbytes | Space available for medium (disk/module) | | item 5 |
| PL_FileMedia Max | num | Max nbr of media (per disk/module) | | item 6 |
| PL_EndOfLine | | End of line character for texts | | item 7 |
| PL_ScreenRect OK | x1, y1, x2, y2 | Platform safety zone (e.g. SAGEM/mode2) | | items 8 to 11 |
| | | This table can be extended to other parameters such as: | | |
| Opacity of the color of the transparency | 0 to 255 | Effectiveness of the transparency | | |

CHART 3

| AC | | Table of actions | | |
|---|---|---|---|---|
| For each action | | | fldAC_AllData | 1 line |
| AC_Ident | | Action identifier | | item 1 |
| AC_Type | <AC_Type_list> | Type of action (depending on what the action pertains to) | | item 2 |
| AC_Name | | Name of the action | | item 3 |
| AC_NbPar | num | Number of parameters | | item 4 |
| For each PL | | ⇒ for the types dependent on the PLs | card PL_i | j |
| AC_Dispo | Bool | True if action available for this platform | | item 2 |
| AC_Data | If available | If available: description of the action for the platform E.g.: name of the function or of the procedure to be called | | item 3 |

CHART 4

| FO | Table of fonts | --v1 of the editor: Hel 18, 24 and 36 only | | |
|---|---|---|---|---|
| For each font | | | fld FO_AllData | 1 line |
| FO_Ident | Font identifier | | | item 1 |
| FO_Name | Font name | | | item 2 |
| For each PL | | | card PL_j | j |
| FO_Ref | Reference of the font for the target platform. E.g. <br> • MacOS: fo_ident, font name + size <br> • Internet: font name + size <br> • OpenTV: fo_ident, otv_ident | | | items 2 and + |

CHART 5

| EV | Table of events | | (5 min: Up, Down, Right, Left, OK ⇒ type<Remote>) | | |
|---|---|---|---|---|---|
| For each event | | | | fldEV_AllData | 1 line |
| EV_Ident | | | Event identifier | | item 1 |
| EV_Type | <EV_Type_list> | | Event type (depending on what generates the event) | | item 2 |
| EV_Name | | | Event name | | item 3 |
| For each parameter | | | (optional) | | k |
| EV_Param | | | Parameters of the event (depending on the type) | | items 3 + k |
| For each PL | | | | card PL_j | j |
| EV_Avail | bool | | True if event available for this platform | | item 2 |
| EV_Data | if available | | If available: description of the event for the platform <br> e.g. name of the message received in the code | | items 3 and + |

CHART 6

| DO | Table of data | | | | |
|---|---|---|---|---|---|
| For each data item | | | | fld DO_AllData | 1 line |
| D0_Ident | 1 to 3 | | Data identifier – Data_ID = 100 + DO_Ident | | item 1 |
| DO_Origin | <EV_Type_List> | | Origin of the data item: the READ ONLY only (not the <appli>) | | item 2 |
| DO_Type | <VA_Type_List> | | Type of data item ⇒ <num> or <txt> | | item 3 |
| DO_Name | txt | | Name of the data item | | item 4 |
| PH_Line | | | Lines of text (with no comma) or integer number | | item 5 |
| For each PL | | | | card PL_j | j |
| DO_Avail | bool | | True if data available for this platform | | item 2 |
| DO_Data | if available | | If available: description of the data item for the platform <br> e.g. name of API function which returns the data item | | item 3 |

CHART 7

| Event | Ident. | Type | List of parameters | Comments: Events caused by: |
|---|---|---|---|---|
| Keynav | 1 | Remote | Up, down, right, left | Pressing one of the navigation keys of the keyboard or of the remote control |
| KeyNum | 2 | Remote | 0, 1, 2, 3, 4, 5, 6, 7, 8, 9, x | Pressing one of the keys of the numerical pad of the keyboard or of the remote control |
| KeyOK | 3 | Remote | | Pressing the send key |
| KeyHome | 4 | Remote | | Pressing the Menu key |
| KeyBack | 5 | Remote | | Pressing the Return key |
| AppliStart | 6 | Appli | | The application has been launched and causes this message |
| SceneOpen | 7 | Appli | | With each opening of an event is generated |
| TimeExpired | 8 | Appli | 1 to 20 | When a timer has finished its time, this event is generated |
| SceneClosed | 9 | Appli | | On the closing of a scene, this event is caused |
| event1 | 10 | ?? | | Prewiring of an event to be defined |
| event2 | 11 | ?? | | Prewiring of an event to be defined |
| event3 | 12 | ?? | | Prewiring of an event to be defined |
| event4 | 13 | ?? | | Prewiring of an event to be defined |
| event5 | 14 | ?? | | Prewiring of an event to be defined |
| MpegAff | 15 | Appli | | When an image in the broadcast stream is captured and stored, this message is generated |
| InsertCard | 16 | Appli | | Chip card inserted into the reader |
| RemoveCard | 17 | Appli | 0 | Card withdrawn |
| Receptmodem | 18 | Ext | 0 | Log-on request |

CHART 8

| Action | Ident. | Type of action | Number of parameters | Comments: |
|---|---|---|---|---|
| Setbg | 1 | Med (media) | 1 | Displays a background |
| PlayS | 2 | Med | 1 | Plays a synthetic sound |
| PlayA | 3 | Med | 1 | Plays a broadcast sound |
| PutInto | 4 | Var (variable) | 2 | Assigns a data item to a variable |
| AddTo | 5 | Var | 2 | Adds together 2 numbers or concatenates 2 character strings |
| GoScene | 6 | Nav (navigation) | 1 | Change of scene |
| GoBack | 7 | Nav | 0 | Returns to the previous scene |
| DesignOpt | 8 | Nav | 1 | Change of option |
| LaunchApp | 9 | Nav | 0 | Launches the application |
| QuitApp | 10 | Nav | 0 | Quits the application |
| ShowObj | 11 | Nav | 1 | Displays the object |
| HideObj | 12 | Obj | 1 | Hides the object |
| SetTimer | 13 | Dec (decoder) | 2 | Sets a timer to a certain value in milliseconds |

CHART 8-continued

| Action | Ident. | Type of action | Number of parameters | Comments: |
|---|---|---|---|---|
| Selectserv | 14 | Dec | 1 | Selects the TV service (causes zapping) |
| StopTimer | 15 | Dec | 2 | Stops the or all the timers |
| Mute | 16 | Dec | 0 | Disables the sound |
| Unmute | 17 | Dec | 0 | Reenables the sound |
| Gl_actn | 18 | ?? | 2 | Prewired action but one which is defined by the user |
| ReadUA | 19 | Dec | 1 | Read the parameter Ua from a chip card |
| Phone | 20 | Dec | 1 | Dial and establish a communication by modem |
| Nothing | 21 | Dec | 0 | Does nothing - default value |
| Multo | | | | Multiplication of 2 numerical integers |
| Divto | | | | Division of 2 numerical integers |

CHART 9

| AP | Application attributes | | | | | AP | ReadAttAP |
|---|---|---|---|---|---|---|---|
| | AP_Desc | | Description of the application | fld AP_Desc | all | | GL_AP-Desc |
| | AP_Author | | Author, mention of © | fld AP_Author | all | | GL-AP-Author |
| | AP_Name | | Name of the application | fld AP_OneData | line 1 | | GL-AP-OneData |
| | AP_Version | | Version | | line 2 | | |
| | AP_Palette | <PA_Ident> | Default color palette (if not defined in the scene) | | line 3 | | |
| | AP_StartSCRead | <Data_ID> | Data item containing the SC_Ident of the starting scene (otherwise: HOME) | | line 4 | | If nothing: −1 |
| | AP_ColTrans | <CO-Ident> | Color of transparency of the appli | | line 5 | | |
| | For each PL | | Indicate which platforms will be generated | | J | | |
| | AP_GenePL | Bool | True if the application will have to be generated for this PL | line 6 | item j | | |

CHART 10

| PA | List of palettes used by the application | | | | | PA | ReadListPal |
|---|---|---|---|---|---|---|---|
| For each palette managed | | | | fldPA_AllData | 1 line | | GL_PA_AllData |
| PA_Ident | | | Palette identifier | | item 1 | | |
| PA_Name | | | Palette name (to facilitate editing) | | item 2 | | |
| For each possible color | | | 15 colors (no video transp col) for OpenTV | | k | | |
| Pal-Ref | <CO_Ident> | | Identifier of the color associated with position in palette | | item k + 2 | | |

CHART 11

| BG | List of backgrounds used by this application | | | | | BG | ReadListBg |
|---|---|---|---|---|---|---|---|
| For each background managed | | | | Fld BG_AllData | 1 line | | GL_BG_Alldata |
| BG_Ident | | | Identifier of the background | | item 1 | | |
| BG_Type | <BGN_Type_List> | | Type of background | | item 2 | | |
| BG_Par | | | Value of the background (depending on type) | | item 3 | | |
| BG_Wait | <BG_Ident>, none | | Bg of type <col>, obligatory if Bgn_Type = <mpeg>SC | | item 4 | | |
| BG_Name | Txt | | Name of the background (to facilitate editing) | | | | |

CHART 12

| Bgn_Type_list | Type of a background |
|---|---|
| <col> | Plain color |
| <video> | Transparency to the video signal |
| <mpeg> | Background MPEG image |
| <pict> | Image bitmap ("tile" overlap) |

CHART 13

| ME | | List of media of the application | | | | | |
|---|---|---|---|---|---|---|---|
| For each medium managed | | | fld ME_AllData | 1 line | ME | ReadListMedia | |
| ME_Ident | | Identifier of the medium | | item 1 | | GL_ME_AllData | |
| ME_Type | <ME_Type List> | Type of medium | | item 2 | | GL_ME_AllName | |
| ME_Load | <"AP" or "SC"> | Update by generation? | | item 3 | | | |
| ME_GetorExit | Bool | If true and no medium: quit ⇒ when ME_Load = "AP" (=false if SC) | | item 4 | | GetOneMedia (ME_Ident) | |
| ME_Usage | <int> or <ext> | If external: editable in "usage" mode | | item 5 | | GL_ME_OneData | |
| For each PL | | | | J | | GL_ME_OneName | |
| ME_RefIdent | | Reference of the medium for a platform | | item 5 + j | | | |
| Internal structure: 1 line per ME_RefIdent | | | fld_MeAllRef | 1 line | | ReadListMeREF | |
| ME_RefIdent | | Identifier of the reference | | item 1 | | GL_ME_AllRef | |
| ME_RefPL | | Reminder: platform of this reference (PL Ident) | | item 2 | | | |
| ME_Format | | Format of the referenced medium (pct, gif, mpg, bmp . . .) | | item 3 | | GetMeref (ME_RefIdent) | |
| ME_FileSize | | Physical size of the medium (pict/Module . . .) | | item 4 | | GL_ME_OneRef | |
| ME_RamSize | | Memory size (for preloading) | | item 5 | | | |
| ME_Ref | | Reference of the medium for the platform MacOS: complete route on the disk (pathname) Internet: URL OpenTV: file name containing the medium (in rep DataSunToMac relating to appli and without suffix) | | item 6 | | | |
| ME_Name | | Name of the medium | fld ME_AllName | 1 line | | | |

CHART 14

| VA List of variables of the application | | | | | VA | ReadListVar |
|---|---|---|---|---|---|---|
| For each variable | | At least one variable of text type | Fld VA_AllData | 1 line | | GL_VA_AllData |
| VA_Ident | 1 to 99 | Identifier of the variable - Data_ID = 200 + VA_Ident | | item 1 | | |
| VA_Origin | <appli> | Origin of the data item: READ/WRITE only ⇒ <appli> | | item 2 | | |
| VA_Type | <VA_Type_List> | Type of variable ⇒ <num> or <tex> | | item 3 | | |
| VA_Name | txt | Name of the variable | | item 4 | | |
| VA_Line | | Lines of text (with no comma) or integer number | | item 5 | | |

| VA-Type_List | Types of an application variable |
|---|---|
| <txt> | Can contain any character string |
| <num> | Integer number |

CHART 15

| OC List of interface objects common to all the scenes | | | | | | |
|---|---|---|---|---|---|---|
| For each common object | | | fldOC_Alldata | 1 line | OC | ReadListObj(0) |
| OC_Desc | Description of the common object | | | | | |
| Descr_Object | Unit structure for describing an object | | (see later) | items | | GL_OC_AllData |

CHART 16

| AA | Event/Action lines attached to the application | | | | | |
|---|---|---|---|---|---|---|
| For each "appli" action | | | fldAA_Alldata | 1 line | AA | ReadListEva(0) |
| AA_Num | Serial number of the action | | | line num | | |
| AA_Desc | Description of the "appli" action | | | | | GL_AA_Alldata |
| Descr_Action | Unit stucture for describing an action | | (see later) | items | | GL_AA_Allref |

CHART 17

| SC | Attributes individual to a scene | | | fld SC_OneData | | SC | ReadAttSc |
|---|---|---|---|---|---|---|---|
| SC_Ident | | | Identifier of the scene (always at least one scene: HOME) | cd id | line 1 | | GL-SC-OneDate |
| SC_Name | | | Name of the scene | cd name | line 2 | | |
| SC_Palette | <PA_Ident> | | Color palette (if empty: take that of the appli) | | line 3 | | |
| SC_BgFirst | <BG_Ident> | | Identifier of the background for the open scene | | line 4 | | |
| OP_Dep | | OP-Num | Cursor starting postion (−1 = no cursor) | | line 5 | | |
| OP_Keep | | bool | True: restart from the last opt of the scene | | line 6 | | |

CHART 18

| OS | List of interface objects of the scene | | | | ReadListObj |
|---|---|---|---|---|---|
| | | | | OS | (sc_Ident) |
| For each object | | fld OC_AllData | 1 line | | |
| OS_Desc | Description of the object | | | | |
| Descr_Object | Unit structure for describing an object | (see later) | items | | GL_OS_AllData |

CHART 19

| AS | List of events/actions attached to the scene | fld AA_AllData | 1 line | AS | ReadListObj (sc_Ident) |
|---|---|---|---|---|---|
| For each "scene" action | | | | | |
| AS_Num | Serial number of the "scene" action | | line num | | GL_AS_AllData |
| AS_Desc | Description of the "scene" action | (see later) | items | | GL_AS_AllRef |
| Descr_Action | Unit structure for describing an action | | | | |

CHART 20

| PS | List of phrases attached to the scene | | | | | |
|---|---|---|---|---|---|---|
| For each phrase managed | | | fld PH_AllData | 1 line | PS | ReadListPh |
| PH_Ident | | Identifier of the phrase −Data_ID = 1300 + PH_Ident | | item 1 | | GL_PS_AllData |
| PH_Origin | <driver> | Origin of the date item: <driver> (READ ONLY only) | | item 2 | | GL_PS_AllText |
| PH_Type | <txt> | Type of phrase ⇒ tjrs <txt> | | item 3 | | |
| PH_Name | txt | Name of the phrase | | item 4 | | |
| For each line of text | | (character reserved for "line skip" (§)) | fld PH_AllText | 1 line | | |
| PH_Line | | Lines of text | | | | |

CHART 21

| Unit structures | | | | |
|---|---|---|---|---|
| Descr_Object | | Description of an object (scene or appli) | OC_AllData | |
| Obj_Ident | | Identifier of the object | item 1 | |
| Obj_Level | | Level (for display: 1 behind, last in front) | item 2 | |
| Obj_Disp_Type | <Obj_Disp_List> | Type of display of the object (Tjrs<sta> if Appli level) | item 3 | |

CHART 21-continued

| Unit structures Descr_Object | | Description of an object (scene or appli) | | OC_AllData | |
|---|---|---|---|---|---|
| Obj_Disp_Val | | Attribute depending on the type of Display | item 4 | GetOneObj (SC_ID,Obj_Ident) | |
| Obj_Type | <Obj_Type_List> | Type of object (see chart) | item 5 | (0 ⇒ "AP") | |
| Obj_Name | | Name of object (without commas) | item 6 | GL_Obj_OneData | |
| Obj_Data | | Attributes of the object (depending on its type: 8 max) | items 7 to 14 | | |

CHART 22

| Obj_Disp_list | | Possible values for the DISP attribute of an object | Attributes |
|---|---|---|---|
| | <sta> | Direct display for OpenScene, no conditions | |
| | <dyn> | Display via the actions of type <obj> (bool: OpenScene) | Bool |
| | <opt> | Display when the position xxx of the cursor is designated | OP_Num |

CHART 23

| Obj_Type_list | Type of an object |
|---|---|
| <pict> | Image bitmap |
| <gra> | Graphic generated with no external medium |
| <text> | text |

CHART 24

Value of Obj_Data as a function of Obj_Type

| | ref | posX | posY | WidthMax | HeightMax | Col | Font | Transp |
|---|---|---|---|---|---|---|---|---|
| <pict> | ME_Ident | num pix | num pix | — | — | — | — | Bool |
| <gra> | — | num pix | num pix | num pix | num pix | Pal_Num | — | — |
| <text> | Data_ID | num pix | num pix | num pix | num pix | Pal_Num | FO_Ident | — |

CHART 25

| Descr_EvAction | | Description of an event/action line (scene or appli) | AA_AllData | |
|---|---|---|---|---|
| Act_Event | <EV_Ident> | Identifier of the triggering event | item 1 | |
| Act_EvPar | Ev param | Parameter of the event if necessary (e.g. KeyNav ⇒ Up) | item 2 | |
| Act_Pass | | True if event continuous (default value?) | item 3 | |
| Act_Ident | <AC_Ident> | Identifier of the action to be triggered (of a type) | item 4 | |
| Act_Par1 | | Param 1 for describing the action (depending on the type) | item 5 | GetOneEva(SC_ID,i) |
| Act_Par2 | | Param 2 for describing the action (depending on the type) | item 6 | (0 ⇒ "AP") |
| For each condition (ET) | | | k | GL_Eva_OneData |
| Act_CondRef | | Reference to a condition | item k + 6 | |
| Internal structure: a line by CondRef | | | AA_AllRef | GetOneCond(k) |
| Act_CondRef | | Identifier of the condition | item 1 | GL_Eva_OneRef |
| Act_DataID | <Data_ID> | DO_Ident or VA_Ident or PH_Ident depending on 1st digit | item 2 | (via GL_Eva_OneData) |
| Act_Value | | Value which must have the VarData to execute the action | item 3 | |
| Management rule: | Act_Pass + false if Action = "GoScene", free otherwise | | | |

CHART 26

| Corresponding key name | Event |
|---|---|
| TV | TVKey |
| Quit | QuitKey |
| Standby | StandbyKey |
| Prefs | PrefsKey |
| List | ListKey |
| Date | DateKey |
| P+ | P + Key |
| P− | P − Key |
| Volume+ | Vol + Key |
| Volume − | Vol − Key |
| Mute | Mute/unMuteKey |
| Guide | GuideKey |
| Info | InfoKey |
| Ret | BackKey |
| Up | Up Key |
| Down | DownKey |
| Right | RightKey |
| Left | LeftKey |
| OK | OKKey |
| Menu | Menu Key |
| Message | @Key |
| Radio | RadioKey |
| 0 to 9 | KeyNumb from 0 to 9 |
| A | KeyA |
| B | |
| C | |
| D | |
| — | |
| Z | Key Z |

CHART 27

| | |
|---|---|
| 1,<décodeur>,<num>, TheKeyNum0 example | Do not touch this line data predefined and |
| 2,<appli>,<num>, TheCurOpt,0 example | Do not touch this line data predefined and |
| 3,<pilote>,<txt>, TheCurTime,00h00 example | Do not touch this line data predefined and |
| 4,<ext>,<Num>,TheData0,0 | |
| 5,<ext>,<Num>,TheData1,1 | |
| 6,<ext>,<Num>,TheData2,2 | |
| 7,<ext>,<Num>,TheData4,4 | |
| 8,<ext>,<Num>,TheData5,5 | |
| 9,<ext>,<Num>,TheData6,6 | |
| 10,<ext>,<Num>,TheData7,7 | |
| 11,<ext>,<Num>,TheData8,8 | |
| 12,<ext>,<Num>,TheData9,9 | |

CHART 28

| Scenes level 0 | Level 1 | Level 2 | Level 3 | Level 4 | Number of modules to be acquired | Total memory required |
|---|---|---|---|---|---|---|
| Scene 1 | Scene 2 | Scene 5 | Scene 6 | Scene 7 | 12 | 12 × 30 |
| Medium1:1 | Medium1:1 | Medium1:0 | Medium1:0 | Medium1:0 | | |
| Medium2:1 | Medium2:1 | Medium2:0 | Medium2:0 | Medium2:0 | | |
| Medium3:1 | Medium3:1 | Medium3:0 | Medium3:0 | Medium3:0 | | |
| | | Scene 3 | | | | |
| | | Medium1:1 | | | | |
| | | Medium2:1 | | | | |
| | | Medium3:1 | | | | |
| | | Scene 4 | | | | |
| | | Medium1:1 | | | | |
| | | Medium2:1 | | | | |
| | | Medium3:1 | | | | |
| Scene 2 | Scene 1 | Scene 3 | Scene 5 | Scene 6 | 0 | 6 × 30 |
| Medium1:2 | Medium1:1 | Medium1:0 | Medium1:0 | Medium1:0 | | |
| Medium2:2 | Medium2:1 | Medium2:0 | Medium2:0 | Medium2:0 | | |
| Medium3:2 | Medium3:1 | Medium3:0 | Medium3:0 | Medium3:0 | | |
| | | Scene 4 | | | | |
| | | Medium1:0 | | | | |
| | | Medium2:0 | | | | |
| | | Medium3:0 | | | | |
| Scene 3 | Scene 1 | Scene 2 | Scene 5 | Scene 5 | 0 | |
| Medium1:2 | Medium1:1 | Medium1:0 | Medium1:0 | Medium1:0 | | |
| Medium2:2 | Medium2:1 | Medium2:0 | Medium2:0 | Medium2:0 | | |
| Medium3:2 | Medium3:1 | Medium3:0 | Medium3:0 | Medium3:0 | | |
| | | Scene 4 | | Scene 7 | | |
| | | Medium1:0 | | Medium1:0 | | |
| | | Medium2:0 | | Medium2:0 | | |
| | | Medium3:0 | | Medium3:0 | | |

CHART 28-continued

| Scenes level 0 | Level 1 | Level 2 | Level 3 | Level 4 | Number of modules to be acquired | Total memory required |
|---|---|---|---|---|---|---|
| Scene 5 | Scene 6 | Scene 1 | Scene 4 | | 6 | 9 × 30 |
| Medium1:2 | Medium1:1 | Medium1:0 | Medium1:0 | | | |
| Medium2:2 | Medium2:1 | Medium2:0 | Medium2:0 | | | |
| Medium3:2 | Medium3:1 | Medium3:0 | Medium3:0 | | | |
| | Scene 7 | | | | | |
| | Medium1:1 | | | | | |
| | Medium2:1 | | | | | |
| | Medium3:1 | | | | | |
| Scene 6 | Scene 5 | Scene 1 | Scene 3 | | 0 | |
| Medium1:2 | Medium1:1 | Medium1:0 | Medium1:0 | | | |
| Medium2:2 | Medium2:1 | Medium2:0 | Medium2:0 | | | |
| Medium3:2 | Medium3:1 | Medium3:0 | Medium3:0 | | | |
| | Scene 7 | | Scene 2 | | | |
| | Medium1:1 | | Medium1:0 | | | |
| | Medium2:1 | | Medium2:0 | | | |
| | Medium3:1 | | Medium3:0 | | | |
| | | | Scene 4 | | | |
| | | | Medium1:0 | | | |
| | | | Medium2:0 | | | |
| | | | Medium3:0 | | | |
| Scene 7 | Scene 1 | Scene 3 | Scene 5 | | | |
| Medium1:2 | Medium1:1 | Medium1:0 | Medium1:0 | | | |
| Medium2:2 | Medium2:1 | Medium2:0 | Medium2:0 | | | |
| Medium3:2 | Medium3:1 | Medium3:0 | Medium3:0 | | | |
| | | Scene 2 | | | | |
| | | Medium1:0 | | | | |
| | | Medium2:0 | | | | |
| | | Medium3:0 | | | | |
| | | Scene 4 | | | | |
| | | Medium1:0 | | | | |
| | | Medium2:0 | | | | |
| | | Medium3:0 | | | | |

The invention claimed is:

1. A system for developing interactive applications distributed on a digital transmission channel, these interactive applications installed at a point of the digital transmission network consisting of a succession of scenes incorporating at least images in point mode, video images, sound sequences and information in text file form represented at the level of at least one display monitor, the interactive nature of said interactive applications being produced by way of a specific functionalization of a control interface for a control module of said display monitor furnished with an operating system, said display monitor, said control module and said operating system constituting an execution platform, said system for developing interactive applications comprising:

at least one electronic editor allowing the simulation of a display screen of said display monitor and of the control interface for a control module associated with said display monitor, and means for generating a plurality of virtual objects specific to a considered interactive application, each virtual object of said plurality of virtual objects consisting of components chosen from among at least images in point mode, video images, sound sequences and information in the form of text files to be edited, displayed and represented by said electronic editor so as to form at least one constituent scene of said considered interactive application;

control means for correlating a plurality of event/action pairs, an event being defined as a breakage of state equilibrium of said operating system and an action being defined as one of an initialization and a modification of at least one display and representation parameter for a scene of said considered interactive application said control means for correlating a plurality of event/action pairs comprises means for generating a series of instructions exhibiting a checking structure of a list of requests type for "EVENT" IF condition on any given Boolean variable of a set of Boolean variables being true THEN "ACTION" where "EVENT" designates a variable representative of an event and "ACTION" designates a variable representative of an action conditioned on said set of Boolean variables, said variable "EVENT" being true constituting for each event/action pair a breakage of state equilibrium of said operating system and said action constituting an initialization or a modification of at least one of the display and representation parameters for at least one scene of said considered interactive application, said set of event/action pairs being organized according to a suite of lines of macro-instructions each comprising an execution position field, an event field, an action field, a list of conditions field and a Boolean halt variable field; and means for storing the set of event/action pairs, correlated and constituting said considered interactive application.

2. The system as claimed in claim 1, wherein said display monitor, said control module and said operating system being those of a television receiver, said electronic editor allows the simulation of the display screen of said television receiver and of the control interface for a universal remote control module associated with said television receiver, with a specific key of said simulated universal remote control module there being associated an event, causing the breakage of state equilibrium of said operating system.

3. The system as claimed in claim 1, wherein said display monitor, said control monitor and said operating system being those of one of a workstation and of a microcomputer, said electronic editor allows the simulation of the display screen of said microcomputer and of the control interface for a peripheral input apparatus of said microcomputer, like its keyboard, with a specific key of said peripheral input apparatus there being associated an event causing the breakage of state equilibrium of said operating system.

4. The system as claimed in claim 1, wherein said set of event/action pairs is correlated according to a logic one-to-one mapping between event and action, according to a native interactive application, independently of the access format imposed by the system or platform for access to said considered interactive application.

5. The system as claimed in claim 1, wherein said electronic editor, said means generating virtual objects specific to said considered interactive application and said control means for correlating a plurality of event/action pairs comprise a driver software module making it possible, on the basis of a window for displaying a representation of said control module and of peripheral apparatuses, to receive a corresponding variable "EVENT" and, on the basis of a window for displaying scenes of said considered interactive application, to cause one of their initialization and their modification.

6. The system as claimed in claim 5, further comprising a tool for creating macroinstructions, said tool comprising at least one screen page for correlating event/action pairs, at least one display window for a set of events, a display window for a triggered action associated with one of the events of said set of events, and at least one parameterization window for the action triggered, and means for pointing and for selecting, said correlating of event/action pairs being performed by selecting one event from among the set of events and of the action by way of the pointing means.

7. The system as claimed in claim 5, further comprising a tool for creating virtual objects, said tool for creating virtual objects comprising at least one screen page for creating objects, at least one window for displaying a list of accessible objects, said list of objects being displayed according to a level field and an object designation field, a window for choosing the mode of display/representation of said objects, a field of object type making it possible to discriminate the nature of said objects, and a field relating to a set of parameters dependent on the medium of display/representation of said objects.

8. The system as claimed in claim 5, further comprising a tool for editing the media, said tool for editing the media comprising at least one "Media" screen page window, at least one window for displaying a list of execution platforms, a window for displaying a list of specific media capable of intervening in the composition of a scene, each medium being defined by a name and an attribute, the attribute allocated to a given medium making it possible to discriminate one of the internal and external nature of said medium with regard to the application considered.

9. The system as claimed in claim 5, further comprising a tool for editing phrases in the form of a text file, each phrase comprising an identification number making it possible to assign to this phrase at least one of an interactive application level and at a level of at least one scenes of said considered interactive application.

10. The system as claimed in claim 5, further comprising a scene creation tool comprising at least one window for displaying a list of standard scenes tagged by a specific designation, a window for defining parameters of the chosen scene, parameters including scene identification number, color palette, choice of background on initialization of the scene, and starting position of the cursor, and a window for choosing options, said tool making it possible to create a new scene, to duplicate or to delete an existing scene.

11. The system as claimed in claim 5, further comprising a tool for defining options in a scene, said tool for defining options making it possible on the basis of a given list of options for the scene considered to allot an option determined from among said given list of options, each option corresponding to a display attribute of a virtual object; and to browse and choose an auxiliary option around the option allotted on the basis of a set of control buttons of the control module associated with said display monitor.

12. The system as claimed in claim 5, further comprising a tool for editing the attributes of a given interactive application, said attributes comprising at least one interactive application descriptive comments field, an interactive application author field, an interactive application name field, an interactive application version number field, and an interactive application color palette field.

13. The system as claimed in claim 5, wherein, for each application execution platform, it comprises a set of data tables common to the execution platform/application pair, said set of common data comprising at least:

a table of application data relating to said platform;

a table of characteristic data for each platform;

a table of events relating to said platform;

a table of application actions relating to said platform;

a table of fonts available for said platform.

14. The system as claimed in claim 13, wherein said table of application data relating to said platform is defined for the application considered by way of a text file.

15. The system as claimed in claim 13, wherein each element of the list of scenes, which element relates to a scene considered, a constituent of this application, comprises at least one list of scene attributes, a list of constituent virtual objects of the scene, a list of options, a list of phrases of the scene.

16. The system as claimed in claim 1, wherein each interactive application is defined by a set of lists comprising at least one list of interactive application attributes, a list of common virtual objects, a list of event/action pairs, a list of fonts, a list of media, a list of variables, a list of phrases, a list of color palettes, a list of colors and a list of scenes.

17. The system as claimed in claim 1, wherein the set of data structures and macroinstructions constituting a native interactive application, it furthermore comprises a module for translating said native interactive application into an interactive application dedicated to a determined-type access terminal.

18. The system as claimed in claim 1, wherein, with the aim of developing cyclically broadcast interactive applications accessible on a TV channel from an access terminal furnished with a TV decoder, said system comprises at least:

a manager means for managing a plurality of successive scenes of said considered interactive application according to a level of depth of each scene with regard to the current scene, said manager module making it possible to analyze and to discriminate over a determined number of successive scenes neighboring the current scene the common virtual objects and the common media associated with these objects of these successive scenes from the distinct virtual objects and distinct media associated with these objects of these successive scenes;

means of updating said virtual objects and common media and virtual objects and distinct media for at least one successive scene of this plurality of successive scenes with respect to the current scene, thereby making it possible to optimize the volume of reupdating data and the acquisition time for these updating data as a function of the memory size allocated to each type of medium and of the number of levels of depth of analysis of each successive scene.

* * * * *

UNITED STATES PATENT AND TRADEMARK OFFICE
CERTIFICATE OF CORRECTION

| | | |
|---|---|---|
| PATENT NO. | : 7,146,615 B1 | Page 1 of 1 |
| APPLICATION NO. | : 10/030651 | |
| DATED | : December 5, 2006 | |
| INVENTOR(S) | : Yves Hervet et al. | |

It is certified that error appears in the above-identified patent and that said Letters Patent is hereby corrected as shown below:

On the Title Page:

At line (57), line 11, "pplication" should be -- application --.

In the Claims:

At Column 44, line 11, "scenes" should be -- scene --.

Signed and Sealed this

Fourteenth Day of August, 2007

JON W. DUDAS
*Director of the United States Patent and Trademark Office*